(12) United States Patent
Yahata et al.

(10) Patent No.: US 11,608,548 B2
(45) Date of Patent: Mar. 21, 2023

(54) MARAGING STEEL ALLOY AND METHODS OF MAKING THE SAME

(71) Applicant: THE BOEING COMPANY, Chicago, IL (US)

(72) Inventors: Brennan Yahata, Los Angeles, CA (US); Julie Miller, Malibu, CA (US); John H. Martin, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 84 days.

(21) Appl. No.: 16/589,250

(22) Filed: Oct. 1, 2019

(65) Prior Publication Data

US 2021/0095361 A1   Apr. 1, 2021

(51) Int. Cl.
| | | |
|---|---|---|
| *C22C 38/06* | (2006.01) | |
| *C22C 38/04* | (2006.01) | |
| *C22C 38/10* | (2006.01) | |
| *C22C 38/12* | (2006.01) | |
| *C22C 38/14* | (2006.01) | |
| *C22C 38/22* | (2006.01) | |
| *C22C 38/26* | (2006.01) | |

(Continued)

(52) U.S. Cl.
CPC ............... *C22C 38/06* (2013.01); *C21D 6/00* (2013.01); *C22C 1/06* (2013.01); *C22C 38/04* (2013.01); *C22C 38/105* (2013.01); *C22C 38/12* (2013.01); *C22C 38/14* (2013.01); *C22C 38/22* (2013.01); *C22C 38/26* (2013.01); *C21D 2211/008* (2013.01)

(58) Field of Classification Search
CPC ............ B22F 2003/247; B22F 2998/10; B22F 10/20; B22F 10/30; B22F 2999/00; B22F 3/1039; B33Y 10/00; B33Y 50/00; B33Y 70/00; B33Y 80/00
See application file for complete search history.

(56) References Cited

U.S. PATENT DOCUMENTS

| | | |
|---|---|---|
| 9,738,788 B1 | 8/2017 | Gross et al. |
| 10,030,292 B2 | 7/2018 | Martin et al. |

(Continued)

FOREIGN PATENT DOCUMENTS

| | | |
|---|---|---|
| CN | 109454240 A | 3/2019 |
| CN | 110280764 A | 9/2019 |

(Continued)

OTHER PUBLICATIONS

Maraging Steel, Wikipedia.*

(Continued)

*Primary Examiner* — Jenny R Wu
(74) *Attorney, Agent, or Firm* — Alston & Bird LLP

(57) ABSTRACT

Provided are maraging steel alloys having improved microstructures. Some variations provide maraging steel alloys including a base maraging steel alloy, a grain refiner, and optionally, a strengthening element. The base maraging steel alloy is surface-functionalized with the grain refiner. Other variations provide a method of method of manufacturing maraging steel including mixing a base maraging steel alloy with a grain refiner resulting in a maraging steel mixture, melting the maraging steel mixture, and solidifying the maraging steel mixture forming an equiaxed microstructure.

16 Claims, 22 Drawing Sheets

(51) Int. Cl.
    *C21D 6/00*    (2006.01)
    *C22C 1/06*    (2006.01)

(56) References Cited

U.S. PATENT DOCUMENTS

| | | |
|---|---|---|
| 2017/0021417 A1 | 1/2017 | Martin et al. |
| 2018/0161874 A1 | 6/2018 | Nuechterlein et al. |
| 2018/0312951 A1 | 11/2018 | Martin et al. |

FOREIGN PATENT DOCUMENTS

| | | | |
|---|---|---|---|
| EP | 3446813 A1 | | 2/2019 |
| JP | 2000-273503 A | | 10/2000 |
| JP | 2000273503 A | * | 10/2000 |
| WO | WO 02/092264 A1 | | 11/2002 |
| WO | WO 2015/189919 A1 | | 12/2015 |
| WO | WO 2018/144323 A1 | | 8/2018 |

OTHER PUBLICATIONS

European Application No. 20176934.6, Extended European Search Report dated Oct. 21, 2020 (10 pages).

10.6 Lattice Structures in Crystalline Solids—Chemistry [online] [retrieved Jan. 28, 2020]. Retrieved from the Internet: https://opentextbc.ca/chemistry/chapter/10-6-lattice-structures-in-crystalline-solids/, (Undated) 37 pages.

\* cited by examiner

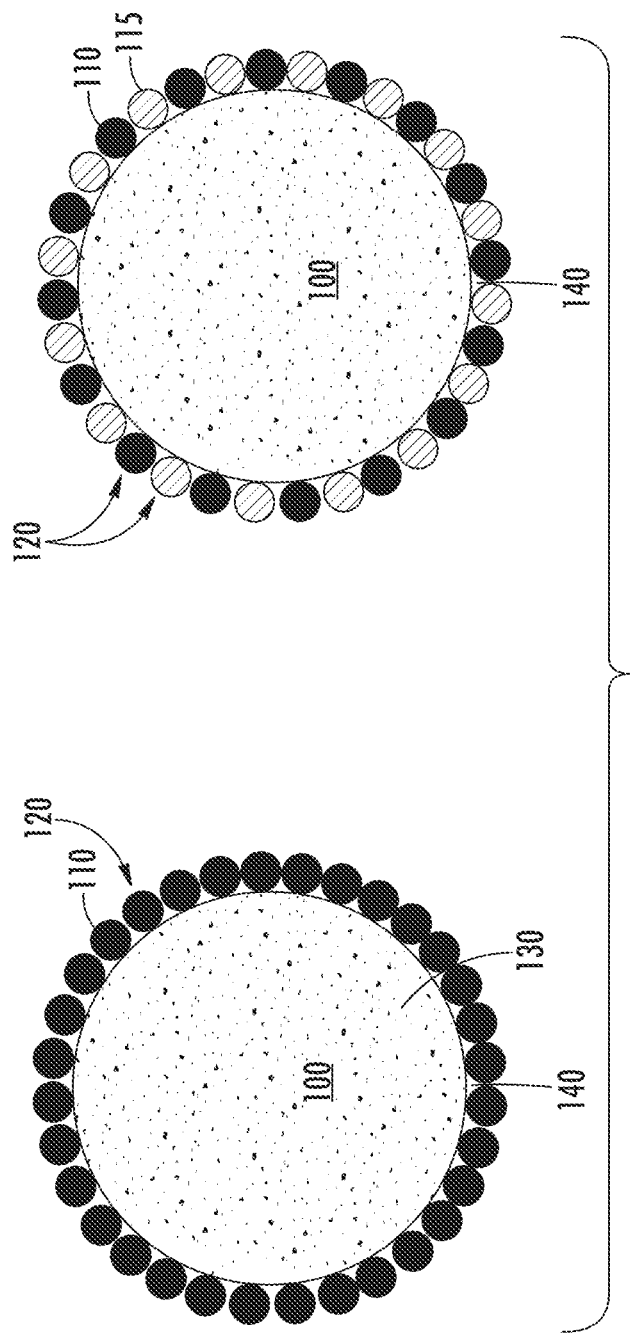

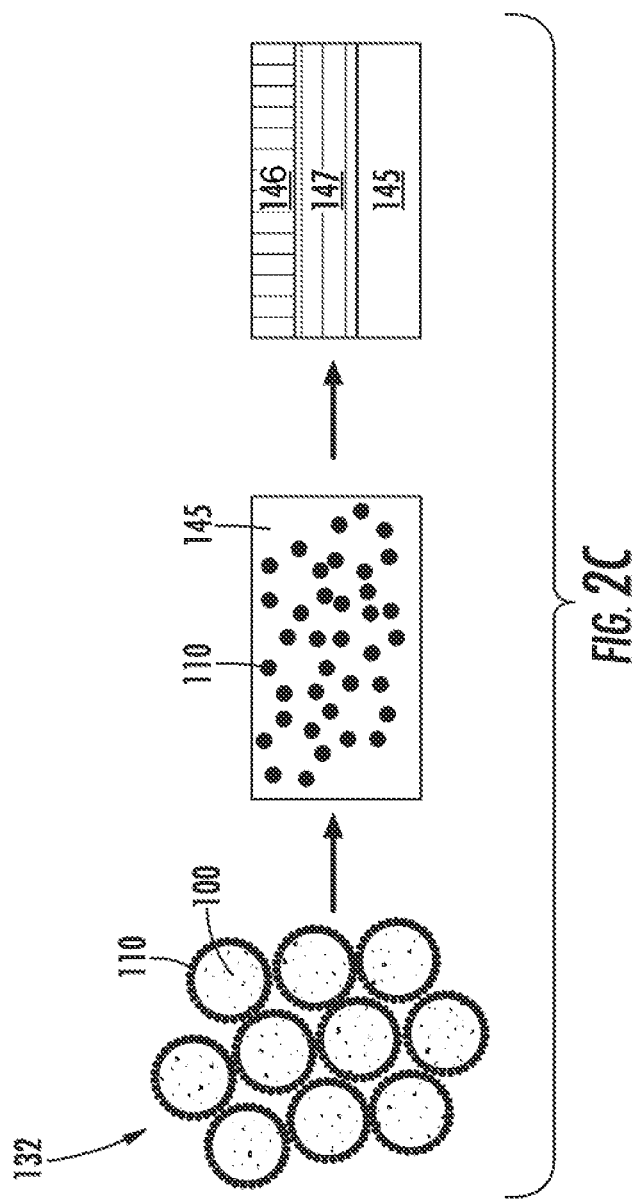

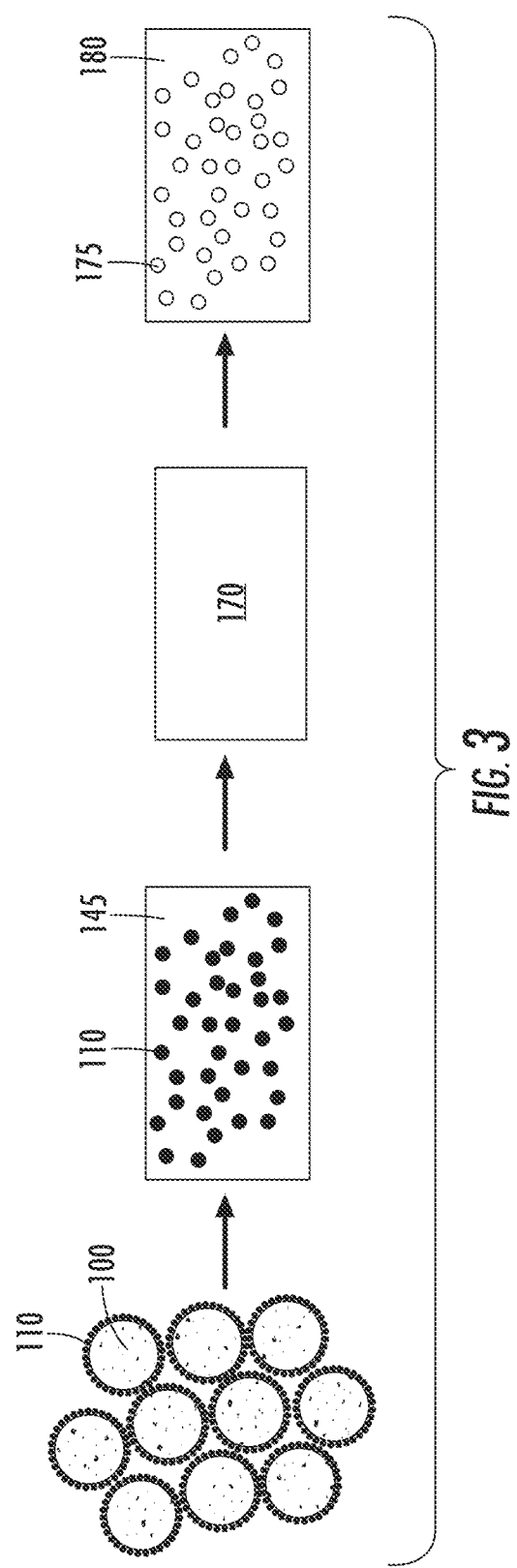

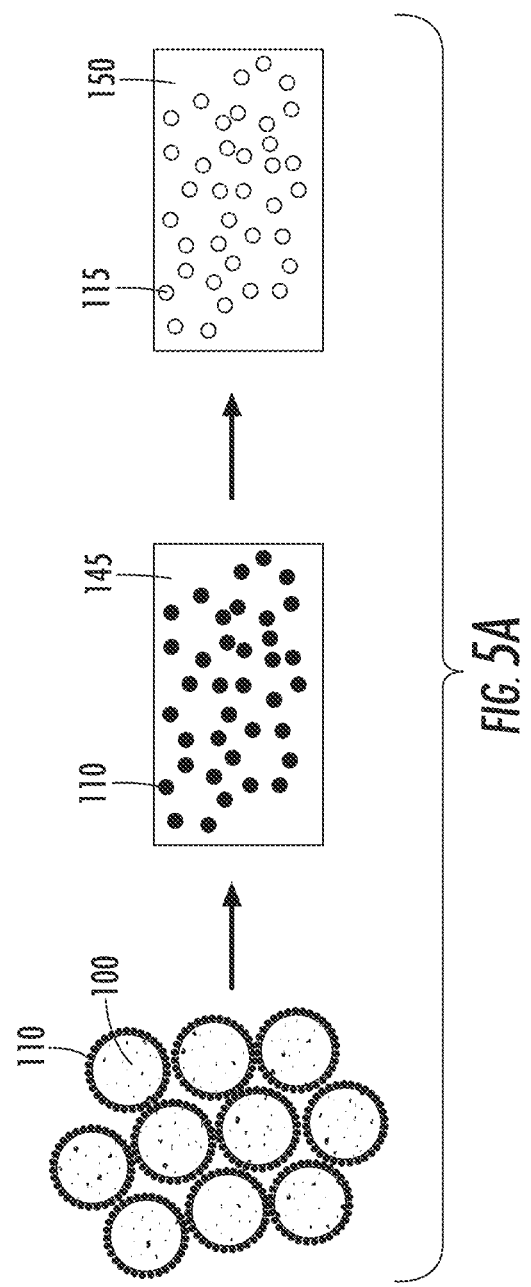

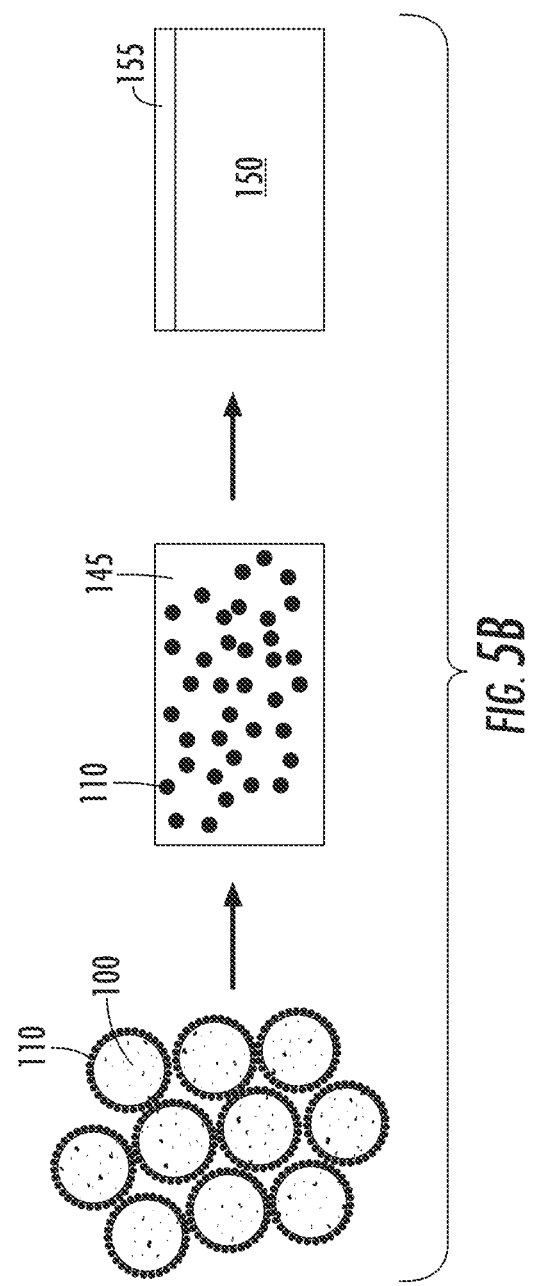

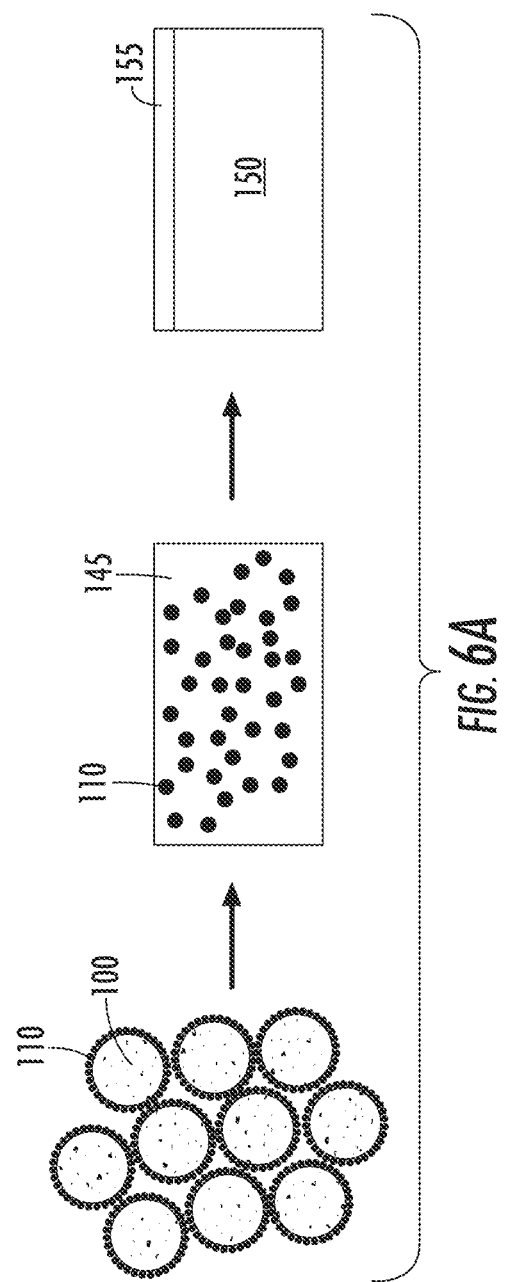

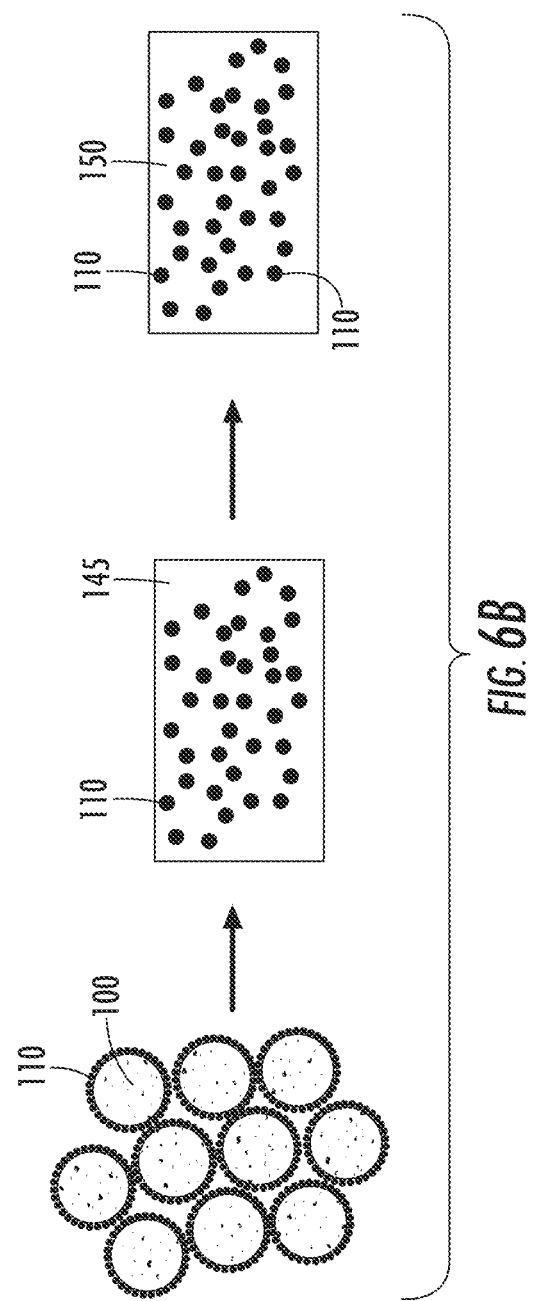

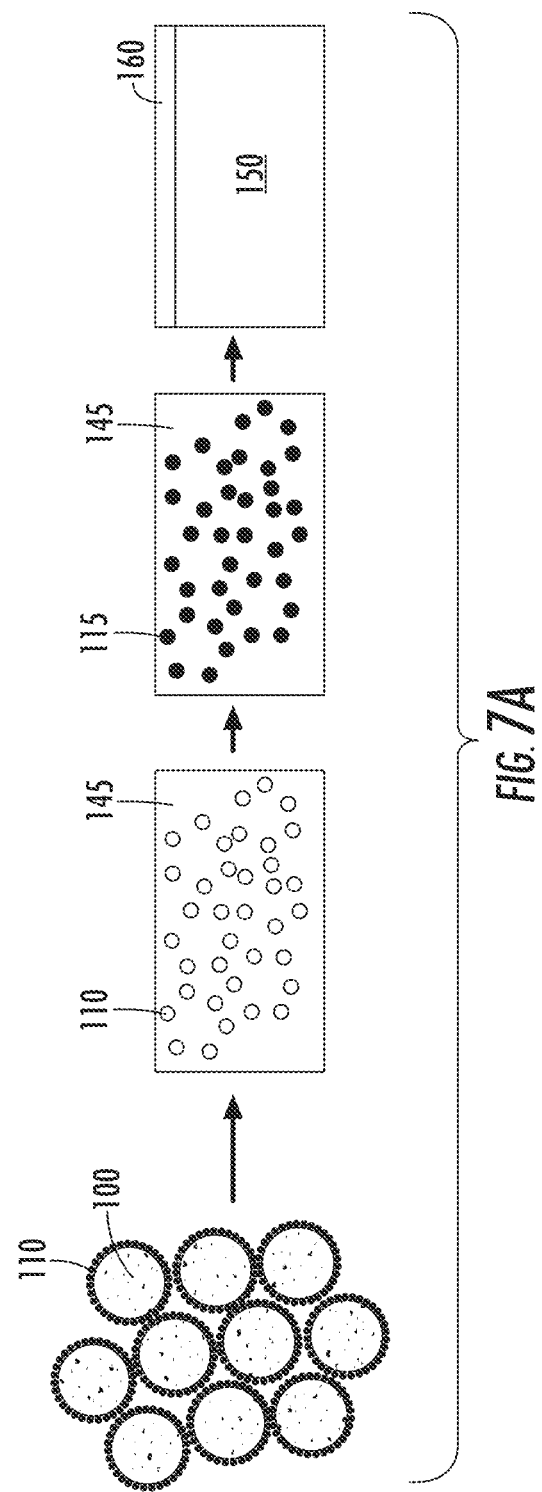

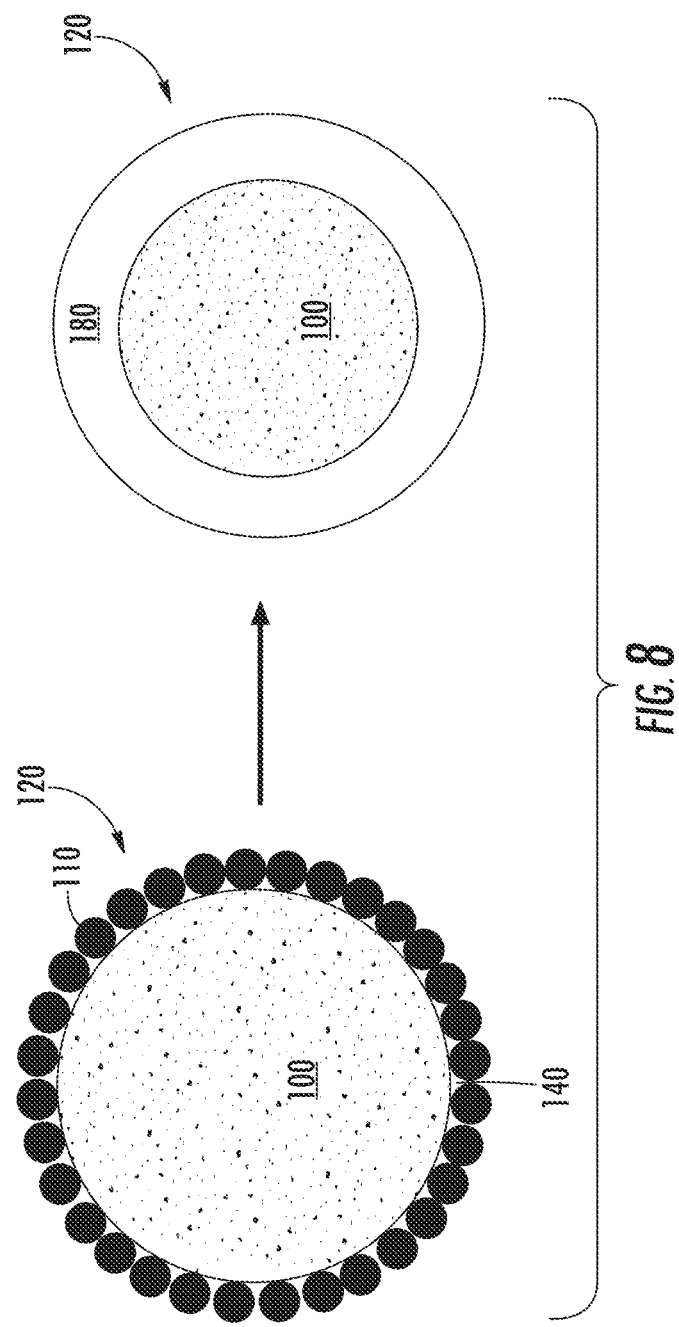

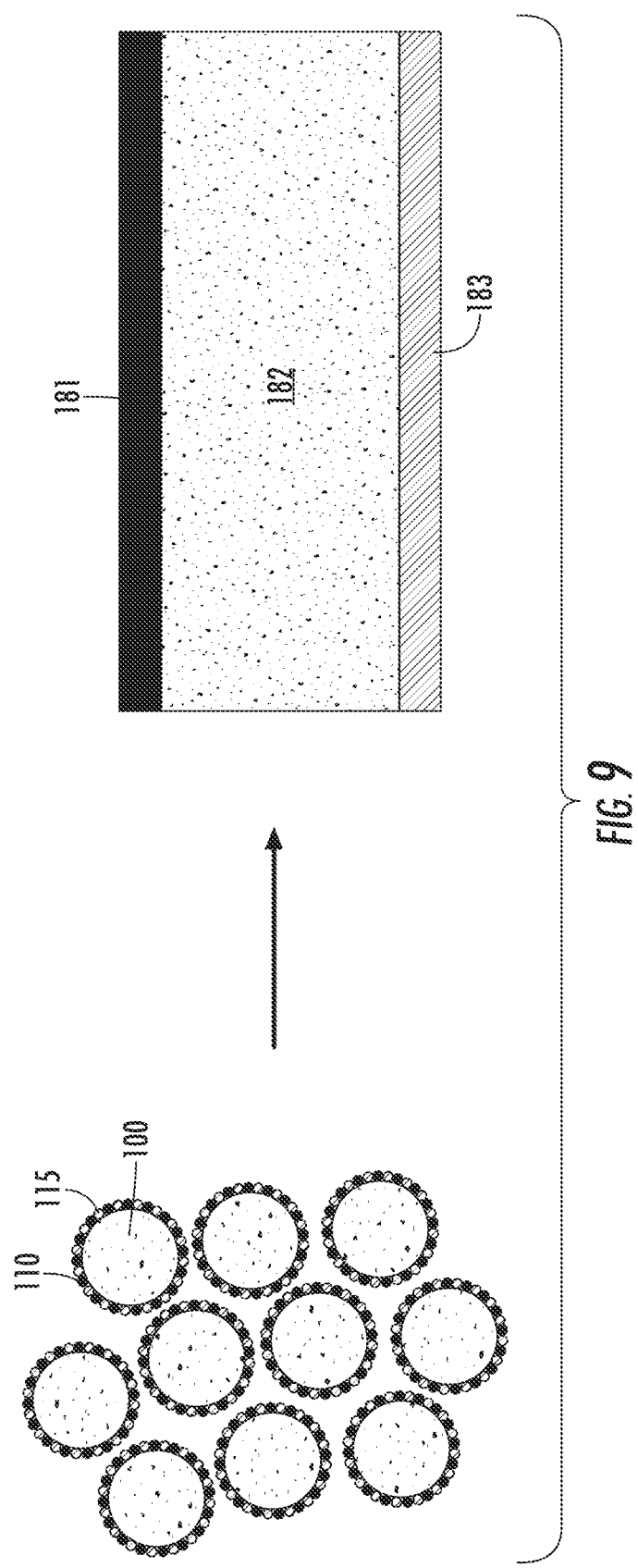

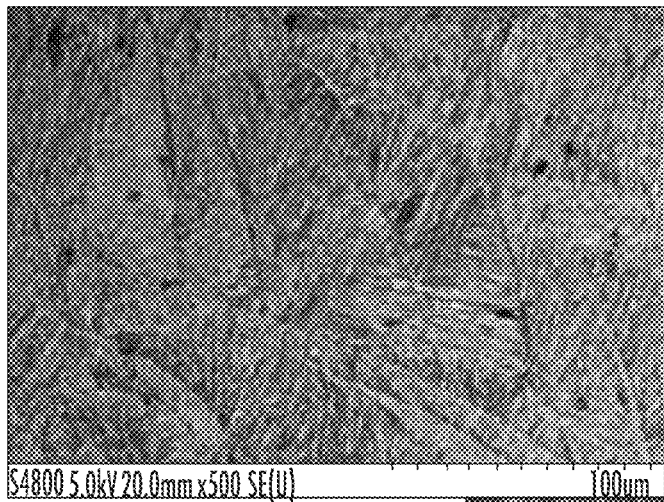
FIG. 11D
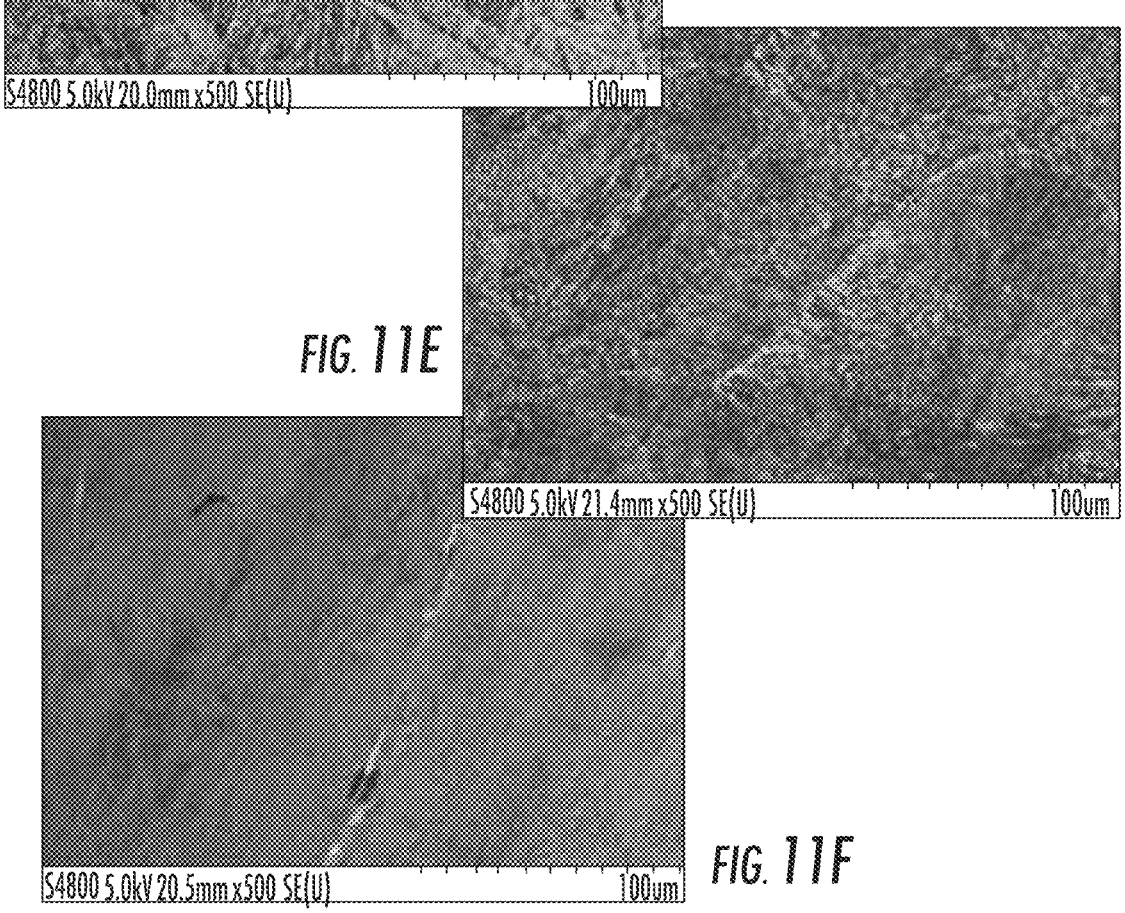
FIG. 11E
FIG. 11F

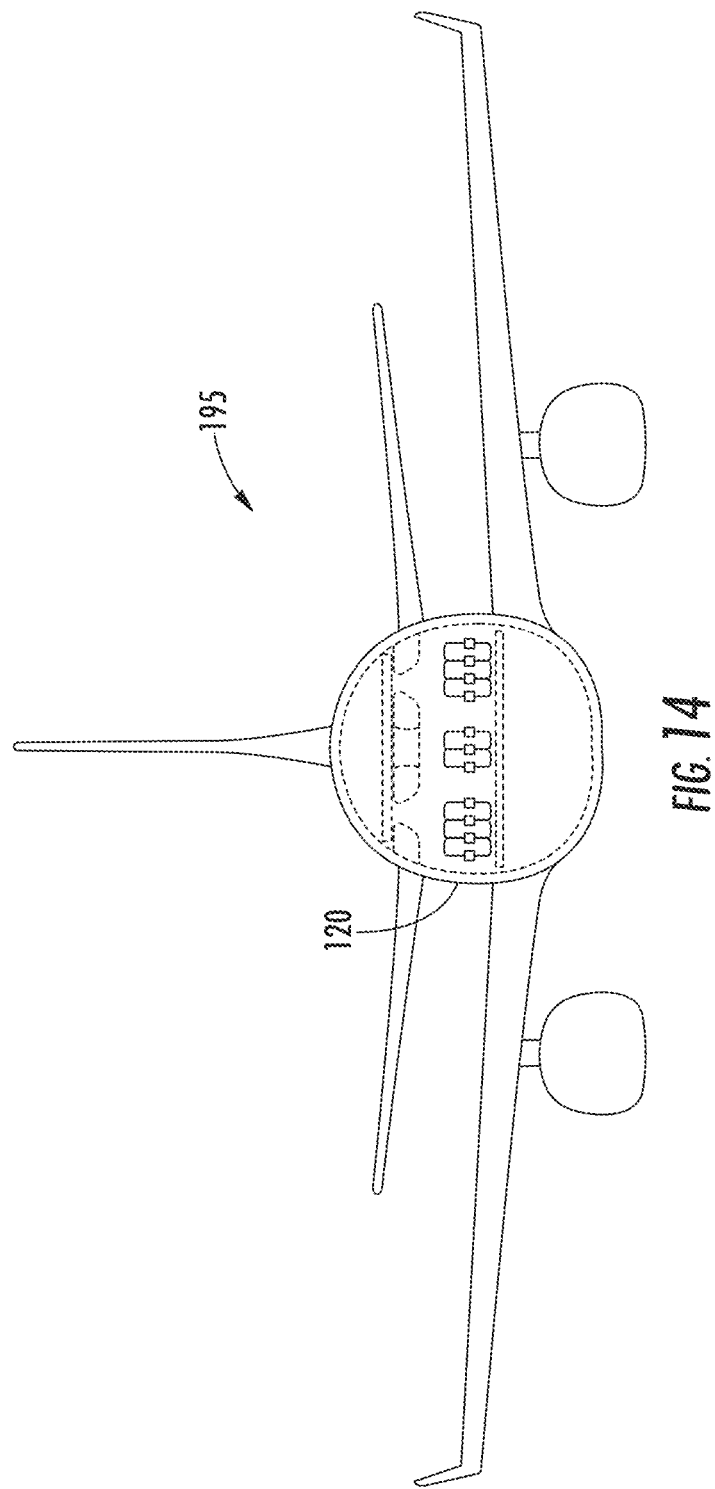

MARAGING STEEL ALLOY AND METHODS OF MAKING THE SAME

FEDERALLY SPONSORED RESEARCH OR DEVELOPMENT

This invention was made with United States Government support under W911W6-16-2-0010 awarded by the Department of Defense. The United States Government has certain rights in the invention.

FIELD

Example embodiments of the present disclosure relate generally to maraging steel alloys and, more particularly, to methods of forming maraging steel alloys.

BACKGROUND

Maraging steel is a low-carbon ultra-high-strength steel having both high tensile strength and high fracture toughness. Previous maraging steel alloys are difficult to process with additive manufacturing. Currently, there is only one high strength steel alloy available for additive manufacturing; however, the alloy suffers from anisotropic material properties and low fracture toughness due to the highly columnar grain structure. Anisotropic material properties and low fracture toughness is typical of many additive steel alloys which all tend to solidify in columnar structures. The iron crystal structures generally have highly anisotropic elastic constants leading to poor overall material properties, including fatigue and fracture toughness. The highly anisotropic elastic constants are due to the high schmid factor difference between misoriented grains leading to high local stress and strain at grain boundaries under normally modest loads introducing premature failure and limiting the strength and toughness that can be achieved.

SUMMARY

A maraging steel alloy and methods of making the same are provided herein. The maraging steel alloy includes grain refiners to produce a unique microstructure during additive manufacturing and enables the production of previously difficult to process alloys. These grain refiners may be targeted to specific alloy compositions and can be incorporated at higher concentrations due to the inclusion of the grain refiners during additive manufacturing processing. Additive manufacturing has been previously limited to weldable or castable alloys. The present disclosure may eliminate this limitation and provide forged-like microstructures rather than the typical columnar structures produced via additive manufacturing. The disclosure may enable additive manufacturing of a variety of high strength and difficult to process maraging steel alloys by utilizing grain refinement to induce equiaxed microstructures which can reduce cracking tendencies and produce more isotropic material properties.

In some embodiments, a maraging steel alloy may be provided, the maraging steel alloy including a base maraging steel alloy, a grain refiner dispersed among the base maraging steel alloy, and optionally, a strengthening element. The base maraging steel alloy may be surface-functionalized with the grain refiner.

In some embodiments, the base maraging steel alloy may include aluminum, cobalt, molybdenum, nickel, titanium, or combinations thereof and has a tensile strength over 1300 MPa. In some embodiments, the grain refiner may include titanium, zirconium, boron, aluminum, tantalum, tungsten, carbon, niobium, cerium, or combinations thereof as pure metals, oxides, hydrides, carbides, nitrides, intermetallics, borides, or combinations thereof. In some embodiments, the grain refiner may include $TiB_2$, $CeO_2$, TiN, NbC, or combinations thereof. In some embodiments, the strengthening element may include nickel, aluminum, cobalt, chromium, molybdenum, carbon, manganese, niobium, zirconium, titanium, or combinations thereof.

In some embodiments, the grain refiner may include from about 0.01% by volume to about 10% by volume of the maraging steel alloy. In some embodiments, the maraging steel alloy may include an equiaxed microstructure. In some embodiments, the equiaxed microstructure may include a plurality of grains of less than 1 mm in diameter, and in some embodiments, the equiaxed microstructure may include uniform grain patterns along an x and y direction. In some embodiments, the equiaxed microstructure may form a scallop pattern.

Provided herein are also methods of manufacturing maraging steel. In some embodiments, the method includes mixing a base maraging steel alloy with a grain refiner resulting in a maraging steel mixture, melting the maraging steel mixture, and solidifying the maraging steel mixture forming an equiaxed microstructure.

In some embodiments, solidifying the maraging steel mixture may include solidifying a first layer of the maraging steel mixture along a single axis, followed by solidifying an adjacent layer of the maraging steel mixture along the same axis.

In some embodiments, the base maraging steel alloy may be present as a powder when mixed with the grain refiner. In some embodiments, the base maraging steel alloy and the grain refiner may have a lattice strain less than 5%. In some embodiments, the base maraging steel alloy and the grain refiner may have an atomic density difference of less than 25%.

In some embodiments, the base maraging steel alloy may include aluminum, cobalt, molybdenum, nickel, titanium, or combinations thereof and the base marginal steel alloy has a tensile strength over 1300 MPa. In some embodiments, the grain refiner may include titanium, zirconium, boron, aluminum, tantalum, tungsten, carbon, niobium, cerium, or combinations thereof as pure metals, oxides, hydrides, carbides, nitrides, intermetallics, borides, or combinations thereof. In some embodiments, the base maraging steel alloy may further include a strengthening element comprising nickel, aluminum, cobalt, chromium, molybdenum, carbon, manganese, niobium, zirconium, titanium, or combinations thereof. In some embodiments, the grain refiner may include $TiB_2$, $CeO_2$, TiN, NbC, or combinations thereof. In some embodiments, the grain refiner may include from about 0.01% by volume to about 10% by volume of the maraging steel alloy.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale:

FIG. 1 illustrates exemplary grain refiners disposed along base maraging steel alloy in accordance with some example embodiments described herein;

FIG. 2C illustrates exemplary additive manufacturing of the functionalized maraging steel alloy in accordance with some example embodiments described herein;

FIG. 3 illustrates exemplary semi-passive solidification control including peritectic reactions of dissolved grain refiners upon cooling, leading to grain refiner formation of dispersoids in accordance with some example embodiments described herein;

FIG. 5A illustrates exemplary semi-passive solidification control including thermodynamic control, in which grain refiners react in the melt and the reaction enthalpy is utilized to control heat flow during solidification in accordance with some example embodiments described herein;

FIG. 5B illustrates exemplary semi-passive solidification control including thermodynamic control, in which grain refiners or a reaction product thereof are driven to the surface, where vaporization removes heat from the system in accordance with some example embodiments described herein;

FIG. 6A illustrates exemplary semi-passive solidification control including conductivity or emissivity control, in which grain refiners driven to the surface form a layer with a different conductivity or emissivity than the underlying material in accordance with some example embodiments described herein;

FIG. 6B illustrates exemplary semi-passive solidification control including conductivity or emissivity control, in which grain refiners remain distributed and change the conductivity of the melt and the final solid material in accordance with some example embodiments described herein;

FIG. 7A illustrates exemplary semi-passive solidification control including contaminant removal and rejection to the surface in accordance with some example embodiments described herein;

FIG. 8 illustrates exemplary surface melting of a functionalized maraging steel alloy particle, in which heat is applied and the grain refiners react with the surface to form a melt in less than 100% of the particle volume in accordance with some example embodiments described herein;

FIG. 9 illustrates the exemplary formation of a layered composite structure, in which a functionalized maraging steel alloy having two different types of grain refiners leads to different particle segregation, resulting in a layered structure in accordance with some example embodiments described herein;

FIGS. 11a-11f illustrates various microstructures including equiaxed microstructures in accordance with some example embodiments disclosed herein;

FIG. 14 illustrates an exemplary application of functionalized maraging steel alloys in an aircraft in accordance with some example embodiments described herein.

DETAILED DESCRIPTION

Figure 2A:
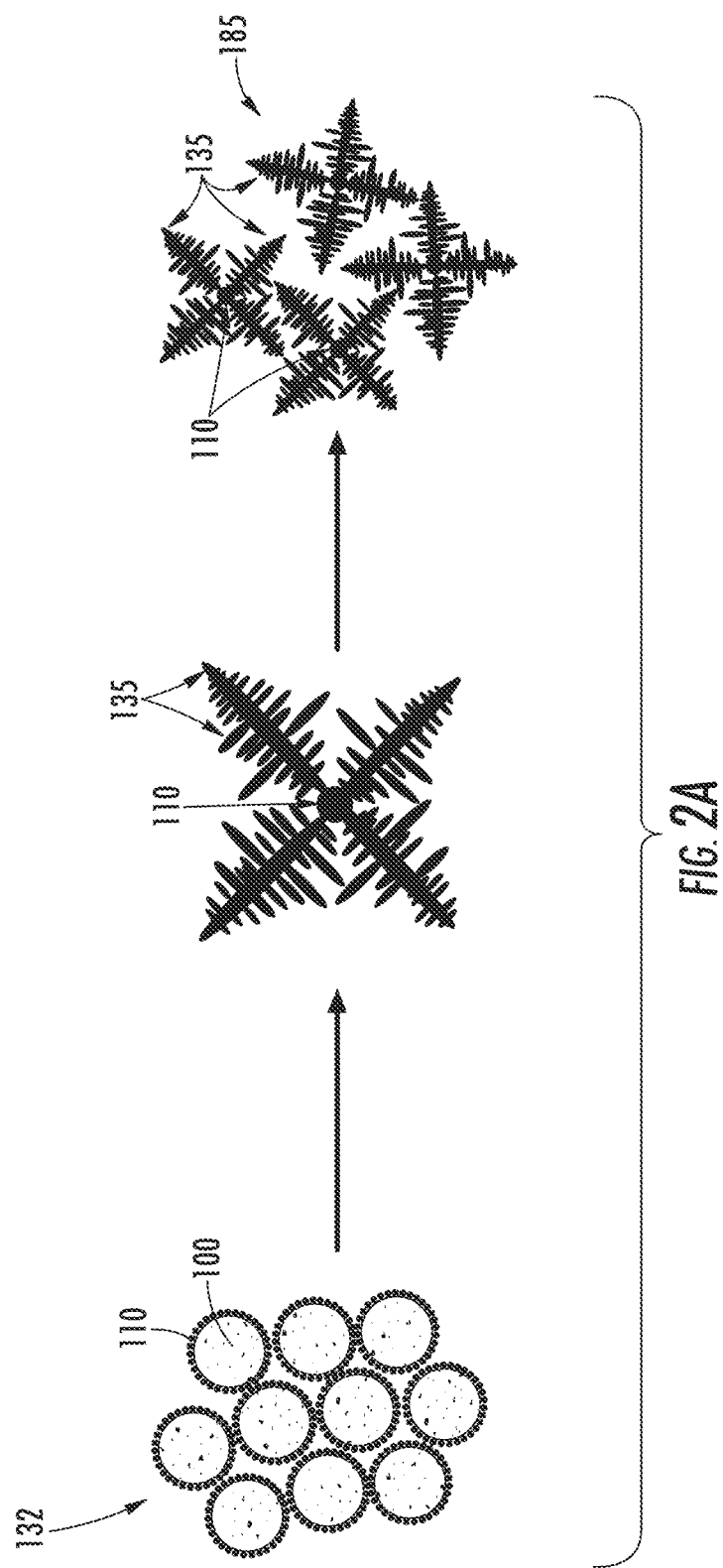
FIG. 2A illustrates exemplary semi-passive solidification control including nucleation control, in which grain refiners act as nucleation sites which lead to equiaxed grains in the final solid material in accordance with some example embodiments described herein.

In general, embodiments of the present disclosure provided herein include maraging steel alloys and methods of making maraging steel alloys. More specifically, maraging steel alloys having an improved microstructure and methods of making the same are provided. Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

"Anisotropic" refers to the component having at least one chemical or physical property that is directionally dependent. When measured along different axes, an anisotropic component will have some variation in a measurable property. The property may be physical (e.g., geometrical) or chemical in nature, or both. The property that varies along multiple axes may simply be the presence of mass; for example, a perfect sphere would be geometrically isotropic while a cylinder is geometrically anisotropic. The amount of variation of a chemical or physical property may be about 5%, 10%, 20%, 30%, 40%, 50%, 75%, 100%, or more.

"Equiaxed grains" or an "equiaxed microstructure" refers to grains or a microstructure comprising such grains that have equal dimensions along different axes. "Grain boundary" refers to the location where the crystallographic direction of the lattice changes. The dimensions of the grains may be measured from grain boundary to grain boundary.

"Scallop pattern" refers to a repeating occurrence of curved grain boundaries across at least a portion of the microstructure along one axis forming rows of such curved grain boundaries along a second, perpendicular axis. An exemplary scallop pattern may be seen in FIG. 10c of the present disclosure.

The term "by weight" refers to the percent weight of a particular component in the total weight of the compound, composition, layer, or other relevant portion unless otherwise indicated. The term "by volume" refers to percent volume of a particular component in the total volume of the compound, composition, layer, or other relevant portion unless otherwise indicated. Weights and volumes are measured by known methods such weighing the component or using methodologies like ICP-OES or ICP-AES.

"Maraging steel alloy" refers to a class of low-carbon ultra-high-strength steels. The principal alloying element is generally nickel, but the maraging steel alloy may also include cobalt, molybdenum, titanium, aluminum, and other trace elements. Exemplary maraging steel compositions include from about 10 to about 25 wt. % nickel, about 0 to about 20 wt. % cobalt, about 0.1 to about 15 wt. % molybdenum, about 0.01 to about 10 wt. % titanium, and about 0.01 to about 10 wt. % aluminum, with the balance being iron and in some cases carbon. For instance, exemplary maraging steel compositions include about 15 to about 25 wt. % nickel, about 5 to about 15 wt. % cobalt, about 1 to about 10 wt. % molybdenum, about 0.1 to about 2 wt. % titanium, and about 0.01 to about 1 wt. % aluminum, with the balance being iron and in some cases carbon. For instance, exemplary maraging steel compositions include about 17 to about 19 wt. % nickel, about 7 to about 12.5 wt. % cobalt, about 3 to about 5.2 wt. % molybdenum, about 0.15 to about 1.6 wt. % titanium, and about 0.05 to about 0.25 wt. % aluminum, with the balance being iron and in some cases carbon. In some embodiments, manganese may be added to replace nickel or reduce the amount of nickel in the alloy. For instance, the alloy may include about 9 to about 15 wt. % manganese. In some embodiments, the maraging steel alloy may be a cobalt-free maraging steel. For instance, the maraging steel alloy may comprise about 18.9 wt. % nickel, 4.1 wt % molybdenum, and 1.9 wt % titanium with the balance iron. Maraging steel alloys generally have high tensile strengths, such as greater than about 1000 MPa, such as greater than about 1300 MPa or greater than 1600 MPa; though lower strengths are possible with the alloys still being considered maraging steel alloys. Tensile strengths are measured using known methods such as ASTM E8 test methodology.

"Base maraging steel alloy" refers to a maraging steel alloy without a grain refiner. The base maraging steel alloy may include additional elements, e.g., strengthening elements, beyond the exemplary maraging steel alloy composition noted above; however such elements would generally be in trace amounts dissolved in the alloy. The base maraging steel alloy may then be functionalized with grain refiners to form the functionalized maraging steel alloy with an equiaxed microstructure. The grain refiners may be the same elements as in the base maraging steel alloy but are added during additive manufacturing to form the equiaxed microstructure. The composition of the base maraging steel alloy may be similar to the exemplary maraging steel compositions listed above but for the additional elements reducing the balance of iron and/or carbon.

"Grain refiner" refers to additives mixed with the base maraging steel alloy to form an equiaxed microstructure. Due to lattice matching of the grain refiners and base maraging steel alloy, the critical amount of undercooling necessary for nucleation may be reduced resulting in equiaxed growth and reducing the columnar growth found when grain refiners are not mixed with the base maraging steel alloy. The grain refiners may be nanoparticles, microparticles, or combinations thereof.

"Strengthening element" refers to additional elements that may be added to the maraging steel alloy to form the base maraging steel alloy. These strengthening elements may be trace elements dissolved in the base maraging steel alloy.

"Powder" or "micropowder" refers to a state of fine, loose particles. Powder materials are the general feedstock for a powder metallurgy (or similar) process, including but not limited to additive manufacturing, injection molding, and press and sintered applications. As intended herein, "powder materials" refers to any powdered ceramic, metal, polymer, glass, or composite, or combinations thereof. In some embodiments, the powders are metals or metal-containing compounds. The base maraging steel alloy may be provided as a powder prior to melting with one or more grain refiners. Powder sizes are typically between about 1 micron and about 1 mm, but in some cases could be as much as about 1 cm.

The powdered material may be in any form in which discrete particles can be reasonably distinguished from the bulk. The powder materials are not always observed as loose powders and may be present as a paste, suspension, or green body. A green body is an object whose main constituent is weakly bound powder material, before it has been melted and solidified. For instance, a filler rod for welding may consist of the powder material compressed into a usable rod.

Particles may be solid, hollow, or a combination thereof. Particles can be made by any means including, for example, gas atomization, milling, cryomilling, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter. The particles may have one or more shapes such as round, spherical, rod-shaped, crystal, oval, etc. For instance, some particles may be round while other particles may have a rod-shape, while still others have a crystal shape. Various configurations may be possible without deviating from the intent of the present disclosure.

In some embodiments, the particles are in the shape of rods. By "rod" is meant a rod-shaped particle or domain shaped like long sticks, dowels, or needles. The average diameter of the rods may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual nanorod shape. The size of the particles is measured using Coulter Counter or known methods.

"Nanoparticles" refer to particles with the largest dimension between about 1 nm and about 10 microns. A preferred size of nanoparticles is less than about 250 nm, more preferably less than about 100 nm. As intended herein, "microparticles" refer to particles with the largest dimension between about 1 micron and about 100 microns. Nanoparticles or microparticles may be spherical or of arbitrary shape with the largest dimension typically not exceeding the above largest dimensions. An exception is structures with extremely high aspect ratios, such as carbon nanotubes in which the dimensions may include up to about 100 microns in length but less than about 100 nm in diameter. The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the base maraging steel alloy.

"Solidification" generally refers to the phase change from a liquid to a solid. In some embodiments, solidification refers to a phase change within the entirety of the maraging steel volume. In other embodiments, solidification refers to a phase change at the surface of the maraging steel alloy or within a fractional volume of the maraging steel alloy. In various embodiments, at least (by volume) about 1%, 2%, 5%, 10%, 15%, 20%, 25%, 30%, 40%, 50%, 60%, 70%, 80%, 90%, 95%, 99%, or about 100% of the maraging steel alloy is melted to form the liquid state. In certain embodiments, from about 1% to about 90% (by volume) of the maraging steel alloy is melted to form the liquid state. In certain embodiments, from about 2% to about 50% (by volume) of the functionalized maraging steel alloy is melted to form the liquid state. In certain embodiments, from about 50% to about 100% (by volume) of the functionalized maraging steel alloy is melted to form the liquid state. During additive manufacturing, the maraging steel mixture may be melted and then solidified to form the maraging steel alloy with an equiaxed microstructure.

For a metal or mixtures of metals, solidification generally results in one or more solid metal phases that are typically crystalline, but sometimes amorphous. Ceramics also may undergo crystalline solidification or amorphous solidification. Metals and ceramics may form an amorphous region coinciding with a crystalline region (e.g., in semicrystalline materials). In the case of certain polymers and glasses, solidification may not result in a crystalline solidification. In the event of formation of an amorphous solid from a liquid, solidification refers to a transition of the liquid from above the glass-transition temperature to an amorphous solid at or below the glass-transition temperature. The glass-transition temperature is not always well-defined, and sometimes is characterized by a range of temperatures.

"Functionalization" or "surface functionalization" refers to a surface modification on the base maraging steel alloy, which modification significantly affects the solidification behavior (e.g., solidification rate, yield, selectivity, heat release, etc.) of the base maraging steel alloy. In various embodiments, a base maraging steel alloy is functionalized with about 1%, 2%, 5%, 10%, 15%, 20%, 25%, 30%, 40%, 50%, 60%, 70%, 80%, 85%, 90%, 95%, 99%, or about 100% of the surface area of the base maraging steel alloy having the surface-functionalization modifications. The surface modification maybe a surface-chemistry modification, a physical surface modification, or a combination thereof. In some embodiments, functionalization may be identified by a detectible size difference between particles by about 1 order of magnitude. For instance, about 1 cm particles may be functionalized with about 100 μm particles.

In some embodiments, the surface functionalization includes grain refiners disposed along the base maraging steel alloy. The surface functionalization may include a grain refiner particle assembly that is chemically or physically disposed on the surface of the base maraging steel alloy.

Provided herein are maraging steel alloys, products made from such alloys, and methods of making such maraging steel alloys. Maraging steel is generally used in application requiring high-strength to weight ratios. Maraging steel has a both high tensile strength and high fracture toughness, and tempering is generally not required.

Previous maraging steel alloys are difficult to process with additive manufacturing. Additive manufacturing has previously been limited to weldable or castable alloys. Currently, there may be only one high strength steel alloy available for additive manufacturing; however, the alloy suffers from anisotropic material properties and low fracture toughness due to the highly columnar grain structure. The large columnar grains are highly oriented. Anisotropic material properties and low fracture toughness is typical of many additive steel alloys which all tend to solidify in columnar structures. The iron crystal structures generally have highly anisotropic elastic constants leading to poor overall material properties, including fatigue and fracture toughness. The highly anisotropic elastic constants are due to the high schmid factor difference between misoriented grains leading to high local stress and strain at grain boundaries under normally modest loads introducing premature failure and limiting the strength and toughness that can be achieved. The alloys tend to fracture along the direction of grain orientation.

Provided herein is a new maraging steel alloy system including one or more grain refiners to produce a unique microstructure during additive manufacturing. These grain refiners may enable the production of difficult to process alloys using additive manufacturing. The presently disclosed maraging steel alloys and methods of making the same can produce forged-like microstructures rather than columnar structures typically produced when used in additive manufacturing. In the present disclosure, additive manufacturing may be used to functionalize the base maraging steel alloy during processing to cause lattice matching between the grain refiners and the base maraging steel alloy.

The grain refiners may be alloy-specific compositions and may be incorporated at high concentrations due to the inclusion of the grain refiners during processing. The grain refiners may promote desirable equiaxed nucleation resulting in an improved microstructure.

It has been found that using particular grain refiners in an additive process with maraging steel alloys may enable additive manufacturing of a variety of high strength and typically difficult to process maraging steel alloys by inducing equiaxed microstructures, which reduces cracking tendencies and produces more isotropic material properties. It has been found that a higher concentration of grain refiners can be used.

The present disclosure uses base maraging steel alloys functionalized with grain refiners which are lattice matched to a primary or secondary solidifying phase in the base maraging steel alloy or may react with elements in the base maraging steel alloy to form a lattice matched phase to a primary or secondary solidifying phase in the base maraging steel alloy.

In some cases, mixtures of grain refiners may react with each other or with the base maraging steel alloy to form a lattice matched material to the primary or secondary solidifying phase of the base maraging steel alloy.

Maraging steel alloys have unique crystal structures and melting points such that it would be considered difficult to incorporate additives in the alloy. The casting temperature is generally very high for maraging steel alloys. The kinetics at the elevated temperatures make the addition of particles through dissolution or coarsening of the introduced particles difficult. In the present disclosure, the additive melt temperature may not get quite as high and the dwell time may be extremely short (e.g., less than about 0.1 second) thereby allowing for functionalization of the base maraging steel alloy. This is in comparison to the heating and holding at such temperature for casting maraging steel alloys (e.g., greater than about 1 hour).

The present maraging steel alloy can be prepared using any powder based additive manufacturing process, such as selective laser melting (SLM), electron beam melting (EBM), laser engineered net shaping (LENS), and other powder bed-type processes. The base maraging steel alloy may be atomized to increase the surface area available for functionalizing and then mixed with one or more grain refiners. In some embodiments, mixing in liquid form may not uniformly incorporate the grain refiners and thus, the components may be mixed initially in powder form.

Figure 10A:
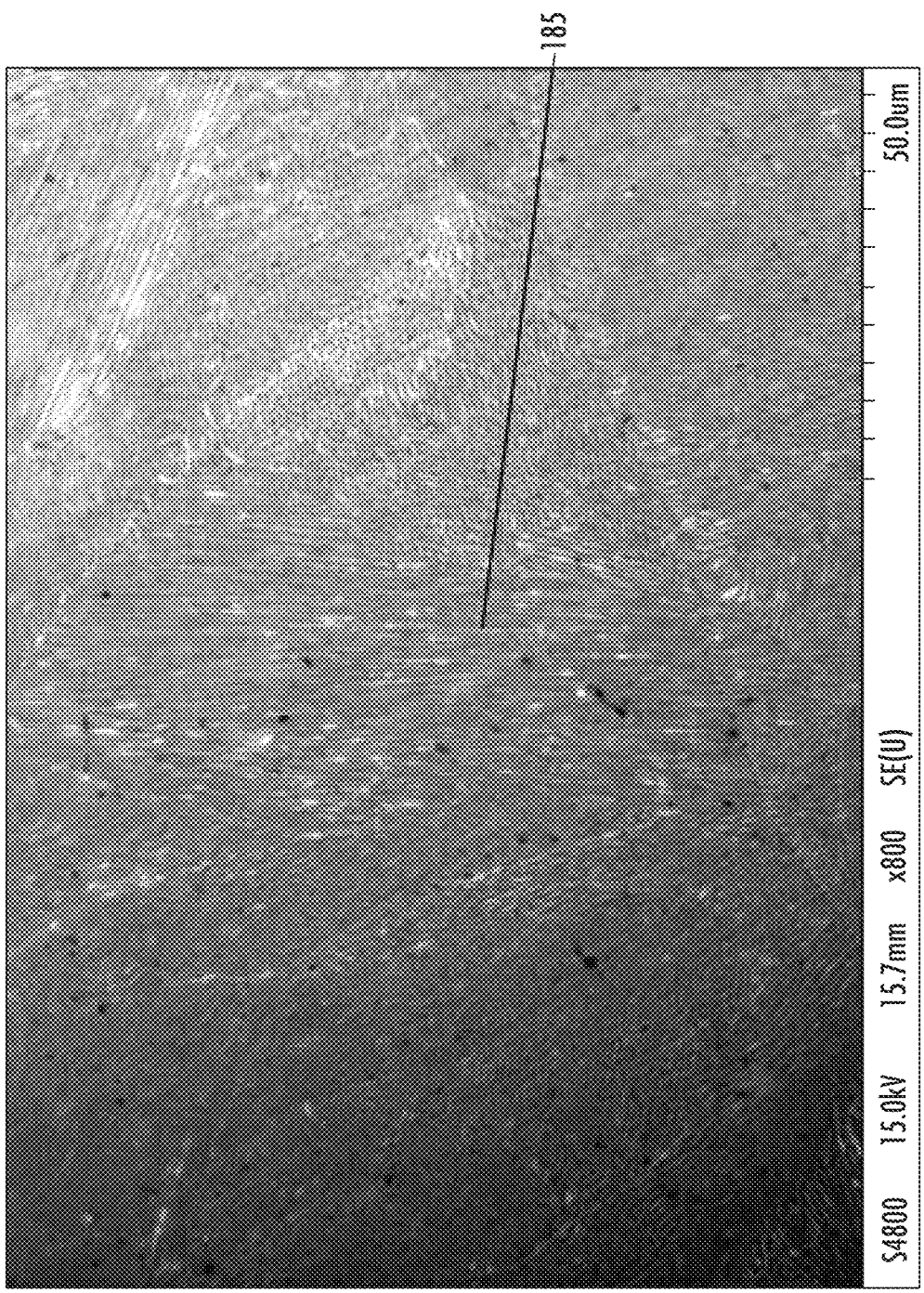
FIGS. 10a-10c illustrates various microstructures including equiaxed microstructures in accordance with some example embodiments disclosed herein.
Figure 10B:
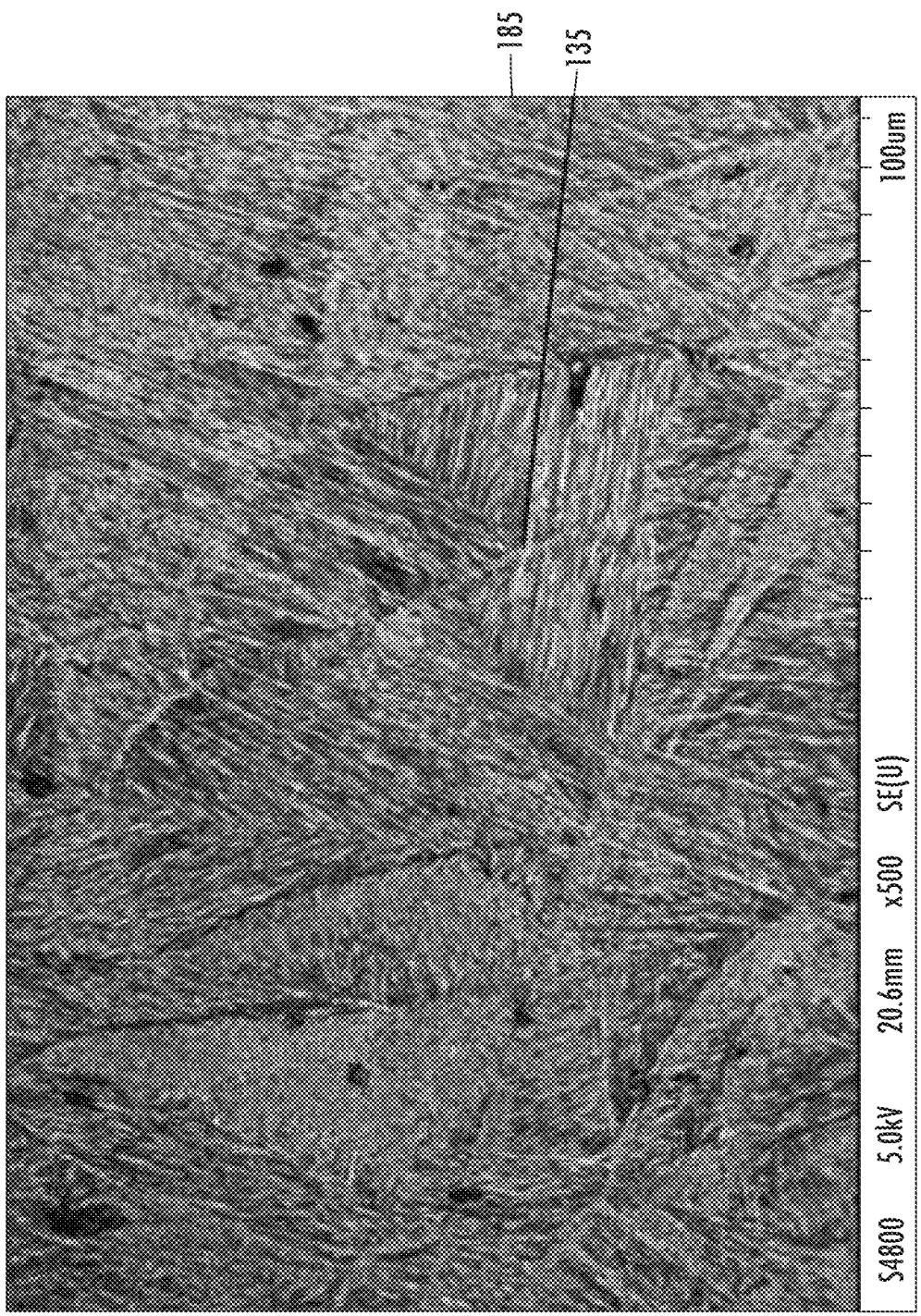
Figure 10C:
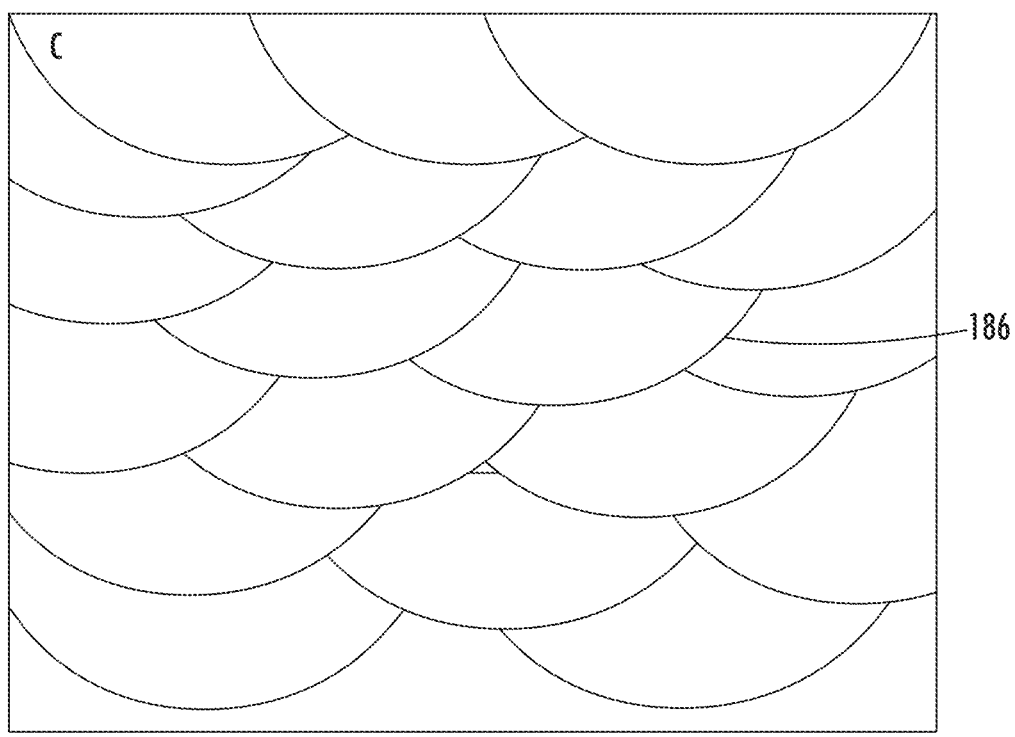

During melting, the grain refiners may be incorporated into the melt and aid in the nucleation of new grains due to the lattice matching, thereby decreasing the critical amount of undercooling necessary for nucleation. In the absence of grain refiners, the high thermal gradient produced during additive manufacturing induces columnar growth. Columnar growth is a serious problem during manufacturing of elastically anisotropic alloy systems. Forcing equiaxed growth with the incorporation of grain refiners produces more isotropic material properties, thus enhancing the alloy system during the additive manufacturing process itself. FIGS. 10a-10c, which is discussed below, provides images of different microstructures including an equiaxed microstructure.

FIG. 1 is a schematic illustration of functionalized maraging steel alloy 120 with either a single type of grain refiner 110 or multiple types of grain refiners 110, 115 dispersed among the base maraging steel alloy 100. In the embodiment illustrated in FIG. 1, the functionalized maraging steel alloy 120 also includes strengthening element 130; however, the inclusion of a strengthening element 130 is optional. As shown in FIG. 1, in some embodiments, the base maraging steel alloy 100 is surface-functionalized with the grain refiner 110, 115. That is, the grain refiners 110, 115 are dispersed along the surface 140 of the base maraging steel alloy 100. Methods of producing surface-functionalized maraging steel alloy, in some embodiments, are further discussed below.

The base maraging steel alloy 100 may include aluminum, cobalt, molybdenum, nickel, titanium, or combinations thereof and, in some embodiments, may have a tensile strength over about 1000 MPa, or over about 1300 MPa, or over about 1600 MPa.

In some embodiments, the grain refiner 110, 115 may include titanium, zirconium, boron, aluminum, tantalum, tungsten, carbon, niobium, cerium, or combinations thereof as pure metals, oxides, hydrides, carbides, nitrides, intermetallics, borides, or combinations thereof. In some embodiments, the grain refiner 110, 115 may include $TiB_2$, $CeO_2$, TiN, NbC, or combinations thereof. The grain refiner 110, 115 may comprise about 0.01% by volume to about 10% by volume of the functionalized maraging steel alloy 120, or, in other embodiments, from about 0.01% by volume to about 8% by volume, from about 0.1% by volume to about 5% by volume, or from about 0.1% by volume to about 1% by volume of the functionalized maraging steel alloy 120. The grain refiners 110, 115 may form nucleating phases and can be incorporated at high enough concentrations through functionalization to reduce the critical undercooling required for equiaxed nucleation.

In some embodiments, the strengthening element 130 may include nickel, aluminum, cobalt, chromium, molybdenum, carbon, manganese, niobium, zirconium, titanium, or combinations thereof.

As further discussed herein, the functionalized maraging steel alloy 120 may have an equiaxed microstructure. In some embodiments, the equiaxed microstructure may include a plurality of grains of less than about 1 mm in diameter. In some embodiments, the equiaxed microstructure may include uniform grain patterns along the x and y direction. In some embodiments, the equiaxed microstructure may form a scallop pattern.

In some embodiments, the grain refiners 110, 115 may be nanoparticles. Due to the small size of nanoparticles and their reactivity, the benefits provided herein may be possible with less than 1% surface area coverage. In general, the grain refiners 110, 115 may have a different chemical composition than that of the base maraging steel alloy 100.

In some embodiments, the grain refiners 110, 115 may be microparticles coating micropowders or macropowders of the base maraging steel alloy 100. In the case of microparticles coating other micropowders or macropowders, functionalization may indicate that the grain refiners 110, 115 are of significantly different dimension(s) than the base maraging steel alloy 100. For example, the grain refiners 110, 115 may be characterized by an average dimension (e.g., diameter) that is less than about 20%, 10%, 5%, 2%, or about 1% of the largest dimension of the functionalized maraging steel alloy 120.

In some embodiments, the surface functionalization also includes direct chemical or physical modification of the surface 140 of the base maraging steel alloy 100, such as to enhance the bonding of grain refiners 110, 115. Direct chemical modification of the surface 140 of the base maraging steel alloy 100, such as addition of molecules, may also be utilized to affect the solidification behavior of the functionalized maraging steel alloy 120. A plurality of surface modifications described herein may be used simultaneously. The concentration of the grain refiner 110, 115 can be varied by varying the amount functionalization on the surface 140 or varying the concentration of functionalized maraging steel alloy versus non-functionalized maraging steel alloy in the final feedstock material.

Some variations provide a powdered base maraging steel alloy 100 comprising a plurality of particles, wherein each of the particles has a particle surface area that is surface-functionalized (such as continuously or intermittently) with grain refiners 110, 115 selected to control solidification of the powdered base maraging steel alloy 100 from a liquid state to a solid state to form an equiaxed microstructure.

In some embodiments, the base maraging steel alloy is characterized in that on average at least about 1%, 2%, 5%, 10%, 15%, 20%, 25%, 30%, 35%, 40%, 45%, 50%, or more and up to about 100% of the particle surface area is surface-functionalized with the grain refiners 110, 115.

In some embodiments, the grain refiners 110, 115 are selected to control solidification of a portion of the base maraging steel alloy 100, such as a region of powdered base maraging steel alloy 100 for which solidification control is desired. Other regions containing conventional powdered base maraging steel alloy 100, without grain refiners 110, 115, may be present. In some embodiments, the grain refiners 110, 115 may be selected to control solidification of a portion of each of the particles (e.g., less than the entire volume of a particle, such as an outer shell).

Exemplary base maraging steel alloys 100 include (but are not limited to) about 10 to about 25 wt. % nickel, 0 to about 20 wt. % cobalt, about 0.1 to about 15 wt. % molybdenum, about 0.01 to about 10 wt. % titanium, and about 0.01 to about 10 wt. % aluminum, with the balance being iron and in some cases carbon. For instance, exemplary base maraging steel alloys 100 include about 15 to about 25 wt. % nickel, about 5 to about 15 wt. % cobalt, about 1 to about 10 wt. % molybdenum, about 0.1 to about 2 wt. % titanium, and about 0.01 to about 1 wt. % aluminum, with the balance being iron and in some cases carbon. For instance, exemplary base maraging steel alloys 100 include about 17 to about 19 wt. % nickel, about 7 to about 12.5 wt. % cobalt, about 3 to about 5.2 wt. % molybdenum, about 0.15 to about 1.6 wt. % titanium, and about 0.05 to about 0.25 wt. % aluminum, with the balance being iron and in some cases carbon.

For instance, exemplary base maraging steel alloys 100 include about 17 to about 19 wt. % nickel, about 8 to about 9 wt. % cobalt, about 3 to about 3.5 wt. % molybdenum, about 0.15 to about 0.25 wt. % titanium, and about 0.05 to about 0.15 wt. % aluminum, with the balance being iron and in some cases carbon. For instance, exemplary base maraging steel alloys 100 include about 17 to about 19 wt. % nickel, about 7 to about 8.5 wt. % cobalt, about 4.6 to about 5.2 wt. % molybdenum, about 0.3 to about 0.5 wt. % titanium, and about 0.05 to about 0.15 wt. % aluminum, with the balance being iron and in some cases carbon. For instance, exemplary base maraging steel alloys 100 include about 18 to about 19 wt. % nickel, about 8.5 to about 9.5 wt. % cobalt, about 4.6 to about 5.2 wt. % molybdenum, about 0.5 to about 0.8 wt. % titanium, and about 0.05 to about 0.15 wt. % aluminum, with the balance being iron and in some cases carbon. For instance, exemplary base maraging steel alloys 100 include about 18 to about 19 wt. % nickel, about 11.5 to about 12.5 wt. % cobalt, about 4.6 to about 5.2 wt. % molybdenum, about 1.3 to about 1.6 wt. % titanium, and about 0.05 to about 0.15 wt. % aluminum, with the balance being iron and in some cases carbon.

In some embodiments, the base maraging steel alloy 100 may include manganese to replace nickel or reduce the amount of nickel in the alloy. For instance, the base maraging steel alloy 100 may include about 9 to about 15 wt. % manganese. In some embodiments, the base maraging steel alloy 100 may be a cobalt-free maraging steel. For instance, the base maraging steel alloy 100 may comprise about 18.9 wt. % nickel, 4.1 wt % molybdenum, and 1.9 wt % titanium with the balance iron.

The selection of the base maraging steel alloy 100 and the grain refiners 110, 115 may depend on the desired properties and should be considered on a case-by-case basis. The processing and final product configuration may also depend on the desired properties.

Figure 13:
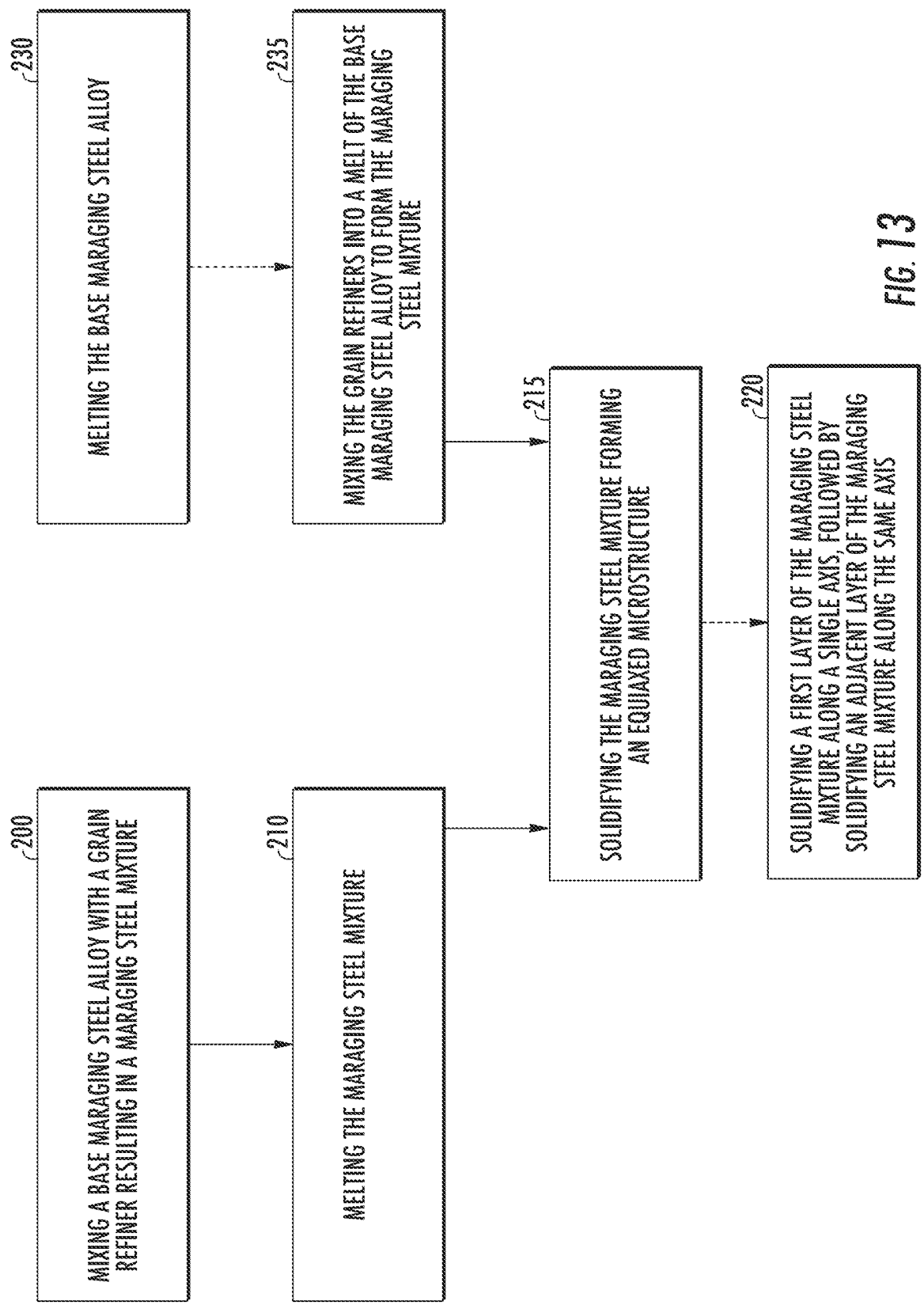
FIG. 13 is a flow chart for an exemplary method of manufacturing maraging steel alloys in accordance with some example embodiments described herein.

FIG. 13 illustrates a method of manufacturing a functionalized maraging steel alloy 120. As shown in FIG. 13, in some embodiments, a method of manufacturing maraging steel alloy may include mixing a base maraging steel alloy with a grain refiner resulting in a maraging steel mixture 200, melting the maraging steel mixture 210, and solidifying the maraging steel mixture forming an equiaxed microstructure 215. In some embodiments, the method may include melting the base maraging steel alloy 230, mixing the grain refiners into a melt of the base maraging steel alloy to form the maraging steel mixture 235, and then solidifying the maraging steel mixture forming an equiaxed microstructure 215.

As shown in FIG. 13, solidifying the maraging steel mixture forming an equiaxed microstructure 215 may include solidifying a first layer of the maraging steel mixture along a single axis, followed by solidifying an adjacent layer of the maraging steel mixture along the same axis 220. Optional steps are illustrated with dotted arrows.

In some embodiments, the base maraging steel alloy 100 may be present as a powder when mixed with the grain refiner 110, 115, such as when mixing a base maraging steel alloy with a grain refiner resulting in a maraging steel mixture 200.

In some embodiments, the base maraging steel alloy 100 and the grain refiner 110, 115 have a lattice strain less than about 10%, such as less than about 8%, such as less than about 5%, or from about 0.001 to about 10%, or from about 0.01 to about 8% or from about 0.1 to about 5%. Lattice strain can be measured by known methods including measuring microscopic lengths using XRD, measuring strain delta d within and without strain, and calculating using known methods. In some embodiments, the base maraging steel alloy 100 and the grain refiner 110, 115 may have an atomic density difference of less than about 35%, such as less than about 30%, such as less than about 25%, or from about 0.001 to about 35%, or from about 0.01 to about 30%, or from about 0.1 to about 25%. Atomic density can be measured by known methods including measuring microscopic lengths using XRD and calculating using known methods. Atomic density and lattice strain may be calculated from the standard crystal structures. The atomic density difference is low and thus, more energetically favorable. For instance, with a high atomic density difference, there may be an extra or missing atom that has nowhere to line up with, resulting in a less energetically favorable configuration.

In some embodiments, the base maraging steel alloy 100 may further comprise a strengthening element 130 comprising nickel, aluminum, cobalt, chromium, molybdenum, carbon, manganese, niobium, zirconium, titanium, or combinations thereof.

In some embodiments, solidifying the maraging steel mixture may include semi-passively controlling solidification of the maraging steel mixture initially in a powdered material from the liquid state to a solid state.

As intended in this description, "semi-passive control," "semi-passively controlling," and like terminology refer to control of solidification during heating, cooling, or both heating and cooling of the functionalized maraging steel alloy 120, wherein the solidification control is designed prior to melting through selected functionalization and is not actively controlled externally once the melt-solidification process has begun. Note that external interaction is not necessarily avoided. In some embodiments, semi-passive control of solidification further includes selecting the atmosphere (e.g., pressure, humidity, or gas composition), temperature, or thermal input or output. These factors as well as other factors known to someone skilled in the art may or may not be included in semi-passive control. The incorporation of grain refiners 110, 115 allows for semi-passive control of the maraging steel mixture to obtain equiaxed microstructures 185 in the final solid product.

Exemplary semi-passive control processes, enabled through surface functionalization as described herein, will now be illustrated.

One route to control nucleation is the introduction of grain refiners 110, 115 to the base maraging steel alloy 100 to prepare a maraging steel mixture. The grain refiners 110, 115 may include any material composition described above and may be selected based on their ability to wet into the melt of base maraging steel alloy 100. Upon melt initiation, the grain refiners 110, 115 wet into the melt pool as dispersed particles which, upon cooling, serve as nucleation sites, thereby producing a fine-grained structure with observable nucleation sites in the cross-section. In some embodiments, the density of nucleation sites is increased, which may increase the volumetric freezing rate due to the number of growing solidification fronts and the lack of a nucleation energy barrier.

In an exemplary embodiment, the grain refiners 110, 115 may be introduced into a base maraging steel alloy 100 melt pool in an additive manufacturing process. The grain refiners 110, 115 then disperse in the melt pool and act as nucleation sites for the solid. The additional well-dispersed nucleation sites can mitigate shrinkage cracks (hot cracking). Shrinkage cracks typically occur when liquid cannot reach certain regions due to blockage of narrow channels between solidifying grains. An increase in nucleation sites can prevent formation of long, narrow channels between solidifying grains, because multiple small grains are growing, instead of few large grains.

In another exemplary embodiment, grain refiners 110, 115 may act as nucleation sites for a secondary phase in a base maraging steel alloy 100. The grain refiners 110, 115 may comprise the secondary phase or a material that nucleates the secondary phase (due to similar crystal structures, for instance). This embodiment can be beneficial if the secondary phase is responsible for blocking interdendritic channels leading to hot cracking. By nucleating many small grains of the secondary phase, a large grain that might block the narrow channel between the dendrites can be avoided. Furthermore, this embodiment can be beneficial if the secondary phase tends to form a continuous phase between the grains of the primary phase, which promotes stress corrosion cracking. By providing additional nucleation sites for the secondary phase, this secondary phase may be broken up and interdispersed, preventing it from forming a continuous phase between grains of the primary alloy. By breaking up a secondary phase during solidification, there is the potential to more completely homogenize the material during heat treatment, which can decrease the likelihood of stress corrosion cracking (fewer gradients in the homogenized material). If the secondary phase is not continuous, long notches from corrosion are less likely.

In another embodiment of nucleation control, the functionalized surface 140 of the base maraging steel alloy 100 may fully or partially dissolve in the melt and undergo a reaction with materials in the melt to form precipitates or inclusions, which may act in the same manner as the grain refiners 110, 115 in the preceding paragraph.

In another embodiment, the grain refiners 110, 115 may react with impurities to form nucleation sites. For instance, carbon and oxygen may be present as impurities in maraging steel and may be reacted with grain refiners 110, 115.

FIG. 2A is a schematic illustration of semi-passive solidification control including nucleation control. The grain refiners 110 are disposed among the base maraging steel alloy 100 forming a maraging steel mixture 132. The grain refiners 110 act as nucleation sites which lead to equiaxed grains 135 forming an equiaxed microstructure 185 in the final solid material.

Figure 2B:
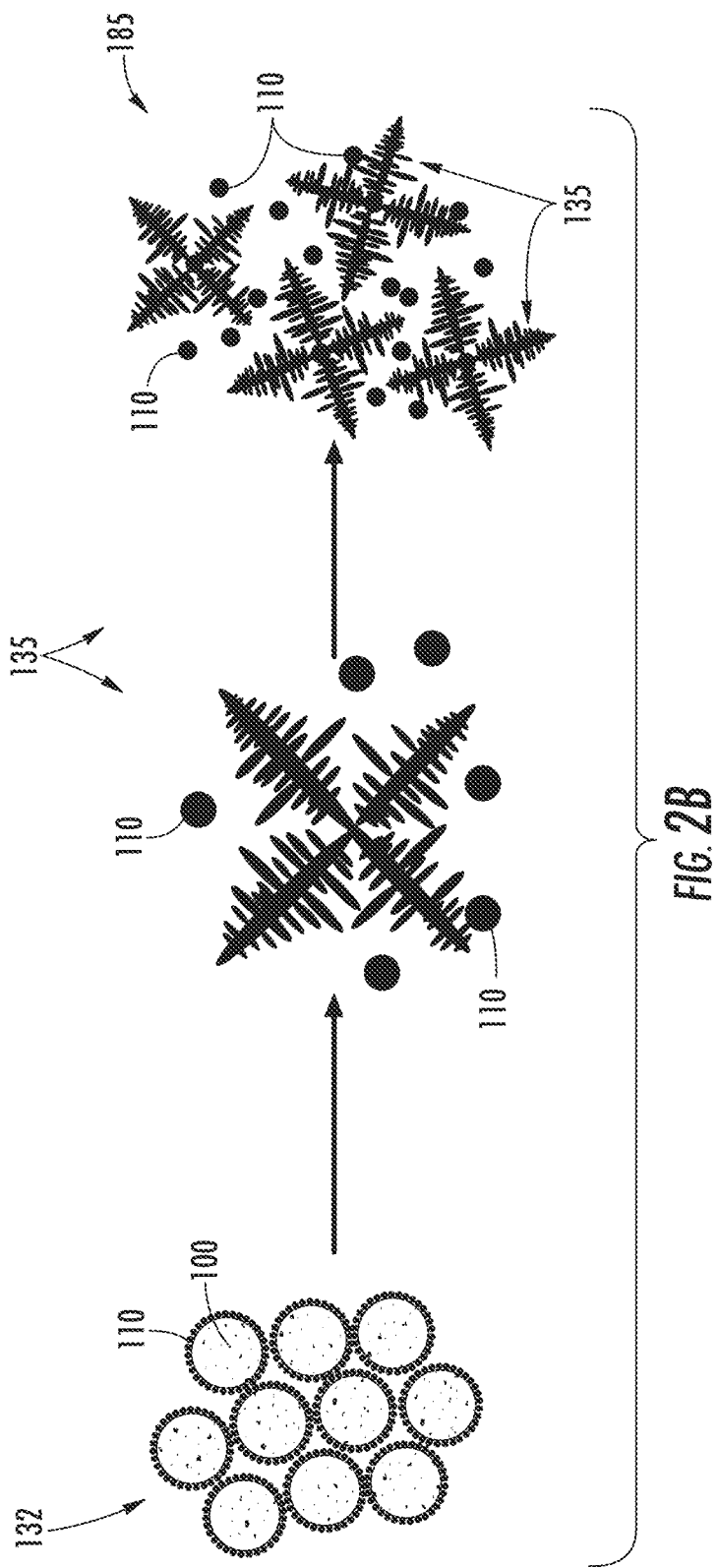
FIG. 2B illustrates exemplary semi-passive solidification control including nucleation control, in which grain refiners prevent runaway growth of individual dendrites, leading to equiaxed grains in the final solid material in accordance with some example embodiments described herein.

FIG. 2B is a schematic illustration of semi-passive solidification control including nucleation control. The grain refiners 110 are disposed among the base maraging steel alloy 100 forming a maraging steel mixture 132. The grain refiners 110 prevent runaway growth of individual dendrites, leading to equiaxed grains 135 forming an equiaxed microstructure 185 in the final solid maraging steel alloy.

FIG. 2C is a schematic illustration of exemplary additive manufacturing of functionalized maraging steel alloy 120. The grain refiners 110 are disposed among the base maraging steel alloy 100 forming a maraging steel mixture 132. The maraging steel mixture 132 is melted forming a melt 145 that is then solidified layer-by-layer to form the final solid product. For instance, as shown in FIG. 2C, a first layer 146 is solidified, followed by a second layer 147 that is adjacent to the first layer 146 and disposed along the same axis as the first layer 146. Various techniques may be used to form the final solid product, such as selective laser melting (SLM), electron beam melting (EBM), laser engineered net shaping (LENS), or combinations thereof.

Grain refiners 110, 115 may promote surface growth of crystals that have good epitaxial fit. Nucleation on the surface of a grain refiner 110, 115 may be more likely when there is good fit between the crystal lattice parameters of the grain refiners 110, 115 and the solidifying base maraging steel alloy 100. Grain refiners 110, 115 may be selected to promote nucleation of a specific phase in the melt.

Generally, nucleation-promoting chemical reactions may be dependent on the selected surface functionalization and on the heating (or cooling) parameters.

As grain refiners 110, 115 are organized on a surface 140 of the base maraging steel alloy 100 under conditions for which rapid melting or near melting occurs and rapidly fuses the particles together with very little melt convection, the grain refiners 110, 115 may not have the time or associated energy to diffuse away from its initial position relative to the other powders. This may in turn create a three-dimensional network structure of inclusions. Thus, a method is provided to control maximum grain size and/or to design a predictable microstructure. The microstructure may be dependent on the initial powder size, shape, and packing configuration/density. Adjusting the coating and powder parameters may allow for control of this hierarchical structure. In some embodiments, these architectures may significantly improve material properties by impeding, blocking, or redirecting dislocation motion in specific directions, thereby reducing or eliminating failure mechanisms.

Utilizing the appropriate functionalization, the heat flow during solidification may be controlled using appropriate heats of fusion or vaporization. In some embodiments, inclusions may be pulled into the melt or reacted within the melt (as described above). In some embodiments, grain refiners 110, 115 may be rejected to the surface of the melt pool. Utilizing a functionalization surface with a high vapor pressure at the desired melting point of the powder, vaporization may occur, resulting in a cooling effect in the melt which increases the freezing rate. The effect of this is easily detectable when comparing non-functionalized maraging steel alloys to functionalized maraging steel alloys 120 under identical conditions, as well as comparing the composition of feed material versus the composition of the final product.

In another embodiment, the opposite effect may occur. Some systems may require slower solidification times than can be reasonably provided in a certain production system. In this instance, a higher-melting-point material, which may for example be rejected to the surface, freezes. This releases the heat of fusion into the system, slowing the total heat flux out of the melt. Heat may also be held in the melt to slow solidification by incorporating a secondary material with a significantly higher heat capacity.

In another embodiment, the heat of formation may be used to control heat flow during melt pool formation and/or solidification. For example, certain grain refiners 110, 115 may be added to the base maraging steel alloy 100 and upon supply of enough activation energy, the exothermic reaction of the components may be triggered. In this case, a large heat of formation may be released which may aid in melting the particles fully or partially. The resulting grain refiners 110,

115 may be absorbed into the melt and stay suspended as a solid (a portion may be dissolved) due to its higher melting point, thereby acting as a nucleation site as well as having a strengthening effect on the alloy later.

Thermodynamic control of solidification may utilize grain refiners 110, 115 which undergo a phase transformation that is different from phase transformations in the base maraging steel alloy. The phase transformations may occur at different solidus and/or liquidus temperatures, at similar solidus and/or liquidus temperatures, or at the same solidus and/or liquidus temperatures. The phase-transformed grain refiners 110, 115 may be incorporated into the final solid material, or may be rejected from the final solid material, or both of these. The phase-transformed grain refiners 110, 115 may be miscible or immiscible with the molten state. The phase-transformed grain refiners 110, 115 may be miscible or immiscible with the solid state.

Thermodynamic control of solidification may utilize grain refiners 110, 115 which vaporize or partially vaporize. For example, such coatings may comprise organic materials (e.g., waxes, carboxylic acids, etc.) or inorganic salts (e.g., MgBr2, ZnBr2, etc.).

Thermodynamic control of solidification may utilize grain refiners 110, 115 which release or absorb gas (e.g., oxygen, hydrogen, carbon dioxide, etc.).

Thermodynamic control of solidification may utilize grain refiners 110, 115 with different heat capacities than the base maraging steel alloy 100.

In addition to controlling the energy within the system, it also is possible to control the rate at which heat leaves the system by controlling thermal conductivity or emissivity (thermal IR radiation). This type of control may be derived from a rejection to the surface or from the thermal conductivity of a powder bed during additive manufacturing, for instance. In one embodiment, the functionalization may reject to the surface a low-conductivity material, which may be the functionalization material directly or a reaction product thereof, which insulates the underlying melt and decreases the freezing rate. In other embodiments, a layer may have a high/low emissivity which would increase/decrease the radiative heat flow into or out of the system. These embodiments are particularly applicable in electron-beam systems which are under vacuum and therefore radiation is a primary heat-flow mechanism.

FIG. 5A is a schematic illustration of semi-passive solidification control including thermodynamic control, in which grain refiners 110 react in the melt 145 and the reaction enthalpy is utilized to control heat flow during solidification. After the grain refiners 110 react in the melt 145, along with control of heat flow, new grain refiners 115 may arise upon solidification to final solid material 150.

FIG. 5B is a schematic illustration of semi-passive solidification control including thermodynamic control, in which grain refiners 110 or a reaction product thereof are driven to the surface of the melt 145, where vaporization removes heat from the final solid material 150. Grain refiners may be present at the surface as a grain refiner layer 155, for example.

In another embodiment, the functionalized surface 140 may be fully absorbed in the melt yet the proximity to other non-melted functionalized maraging steel alloys 120, such as additive manufacturing in a powder bed, may change the heat conduction out of the system. This may manifest itself as a low-thermal-conductivity base powder with a high-conductivity coating.

FIG. 6A is a schematic illustration of semi-passive solidification control including conductivity or emissivity control, in which grain refiners 110 driven to the surface of a melt 145 form a grain refiner layer 155 with a different conductivity or emissivity than the underlying, final solid material 150.

FIG. 6B is a schematic illustration of semi-passive solidification control including conductivity or emissivity control, in which grain refiners 110 remain distributed in the melt 145 and change the conductivity of the melt 145 and the final solid material 150.

Thermal conductivity or emissivity control of solidification may utilize grain refiners 110, 115 which are higher in thermal conductivity compared to the base maraging steel alloy 100. The grain refiners 110, 115 may be incorporated into the melt, or may be rejected, such as to grain boundaries or to the surface of the melt as a grain refiner layer 155. The grain refiners 110, 115 may be miscible or immiscible with the molten state. The grain refiners 110, 115 may be miscible or immiscible with the final solid material 150.

Thermal conductivity or emissivity control of solidification may utilize grain refiners 110, 115 which are lower in thermal conductivity compared to the base maraging steel alloy 100.

Thermal conductivity or emissivity control of solidification may utilize grain refiners 110, 115 which are higher in emissivity compared to the base maraging steel alloy 100.

Thermal conductivity or emissivity control of solidification may utilize grain refiners 110, 115 which are lower in emissivity compared to the base maraging steel alloy 100.

In some embodiments, the functionalized maraging steel alloy 120 may react with contaminants in the melt. When the functionalized maraging steel alloy 120 is properly chosen, the reacted material may be selected such that the formed reaction product has a high surface tension with the liquid, such that it may be rejected to the surface. The rejected reaction product may take the form of an easily removable scale. Optionally, the rejected layer is not actually removed but rather incorporated into the final product. The rejected layer may manifest itself as a hard-facing carbide, nitride, or oxide coating, a soft anti-galling material, or any other functional surface which may improve the desired properties of the produced material. In some cases, the rejected surface layer may be of a composition and undergo a cooling regime which may result in an amorphous layer on the surface of the solidified material. These surface-rejected structures may result in improved properties related to, but not limited to, improved corrosion resistance, stress corrosion crack resistance, crack initiation resistance, overall strength, wear resistance, emissivity, reflectivity, and magnetic susceptibility.

FIG. 7A is a schematic illustration of semi-passive solidification control including contaminant removal and rejection to the surface. In the embodiment illustrated in FIG. 7A, base maraging steel alloy 100 have grain refiners 110 disposed on the surface 140 of the base maraging steel alloy 100. Grain refiners 110 are distributed in a melt 145 and react with contaminants (not shown) from the melt 145, to form new grain refiners 115. The reacted contaminants may be rejected to the surface of the final solid material 150 as a contaminant surface layer 160, for example.

Figure 7B:
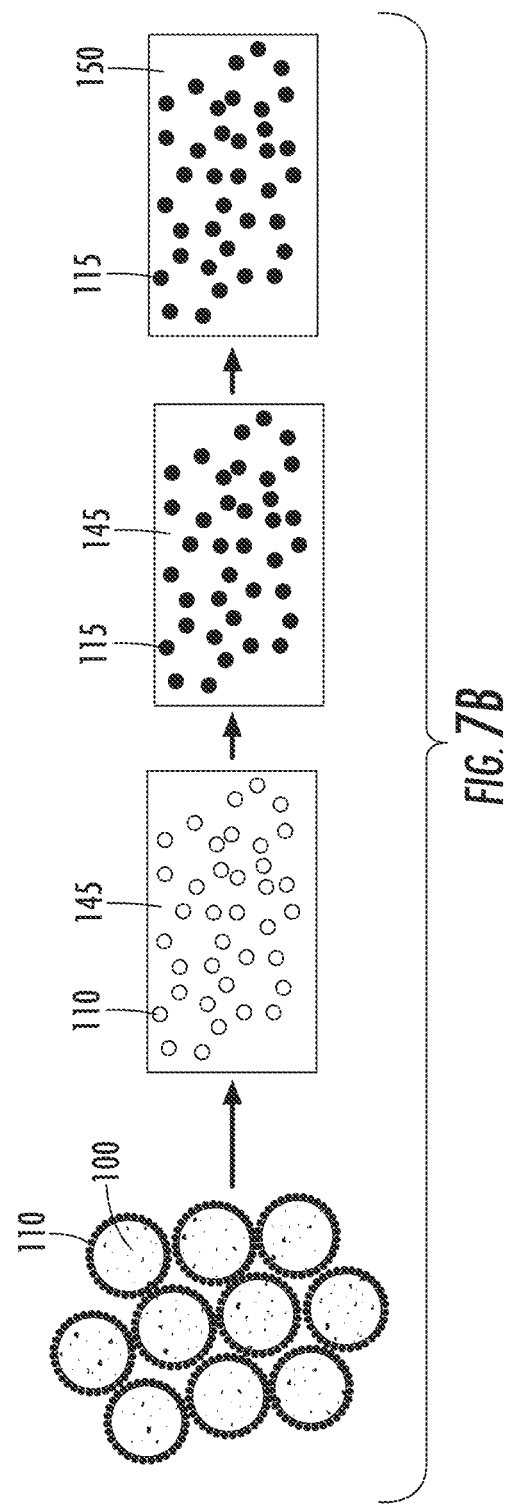
FIG. 7B illustrates exemplary semi-passive solidification control including contaminant reaction, in which the reacted contaminants remain in the solid in accordance with some example embodiments described herein.

FIG. 7B is a schematic illustration of semi-passive solidification control including contaminant reaction, in which the reacted contaminants remain in the solid. Grain refiners 110 are distributed in a melt 145 and react with contaminants (not shown) from the melt 145, to form new grain refiners 115. The new grain refiners 115 may remain in the final solid material 150.

Through contaminant removal or rejection, several scenarios are possible. Grain refiners 110, 115 that react with or bind to undesired contaminants may be incorporated into the solidification, in the same phase or a separate solid phase. The reacted grain refiners 110, 115 may be rejected during solidification. When portions or select elements present in the grain refiners 110, 115 react with or bind to contaminants, such portions or elements may be incorporated and/or rejected.

In some embodiments, the grain refiners 110, 115 may react upon heating to form a lower-melting-point material compared to the base maraging steel alloy 100, such as through a eutectic reaction. The grain refiners 110, 115 may be chosen from a material which reacts with the underlying base maraging steel alloy 100 to initiate melting at the surface 140, or within a partial volume of the base maraging steel alloy 100. A heat source, such as a laser or electron beam, may be chosen such that the energy density is high enough to initiate the surface reaction and not fully melt the entire base maraging steel alloy 100. This results in an induced uniform liquid phase sintering at the particle surface. Upon freezing, the structure possesses a characteristic microstructure indicating different compositions and grain nucleation patterns around a central core of stock powder with a microstructure similar to the stock powder after undergoing a similar heat treatment. This structure may later be normalized or undergo post-processing to increase density or improve the properties.

Another possible reaction is a peritectic reaction in which one grain refiner 110, 115 melts and this melted material diffuses into a second grain refiner 110, 115, to form an alloyed solid. This new alloyed solid may then act as a phase-nucleation center or may limit melting just at the edge of particles.

FIG. 3 is a schematic illustration of semi-passive solidification control including peritectic reactions. In the embodiment illustrated in FIG. 3, the base maraging steel alloy 100 has grain refiners 110 disposed on the surface of the base maraging steel alloy 100. In FIG. 3, grain refiners 110 are distributed in a melt 145. At elevated temperatures, the grain refiners 110 dissolve to form a melt 170. Upon cooling, peritectic reactions take place, leading to grain refiner formation of dispersoids 175 in a melt 180.

Incorporating grain refiners 110, 115 into a molten metal may be challenging when the grain refiners 110, 115 have a thin oxide layer at the surface, since liquid metals typically do not wet oxides well. This may cause the grain refiners 110, 115 to get pushed to the surface of the melt 145. One way to overcome the oxide layer on grain refiners 110, 115, and the associated wettability issues, is to form the grain refiners 110, 115 in situ during melt pool formation. This may be achieved by starting with grain refiners 110, 115 of an element that forms an intermetallic with one component of the base maraging steel alloy 100, while avoiding dissolution of the grain refiners 110, 115 in the melt 145. Alternatively, binary compound grain refiners 110, 115 that disassociate at elevated temperatures, such as hydrides or nitrides, may be used since the disassociation reaction annihilates any oxide shell on the grain refiners 110, 115.

As noted above, the surface functionalization may be designed to be reacted and rejected to the surface of the melt 145. In embodiments employing additive manufacturing, layered structures may be designed. In some embodiments, progressive build layers and hatchings may be heated such that each sequential melt 145 is heated long enough to reject the subsequent rejected layer, thereby producing a build with an external scale and little to no observable layering within the build of the rejected materials. In other embodiments, particularly those which result in a functional or desired material rejected to the surface, heating and hatching procedures may be employed to generate a composite structure with a layered final product. Depending on the build parameters, these may be randomly oriented or designed, layered structures which may be used to produce materials with significantly improved properties.

Figure 4:
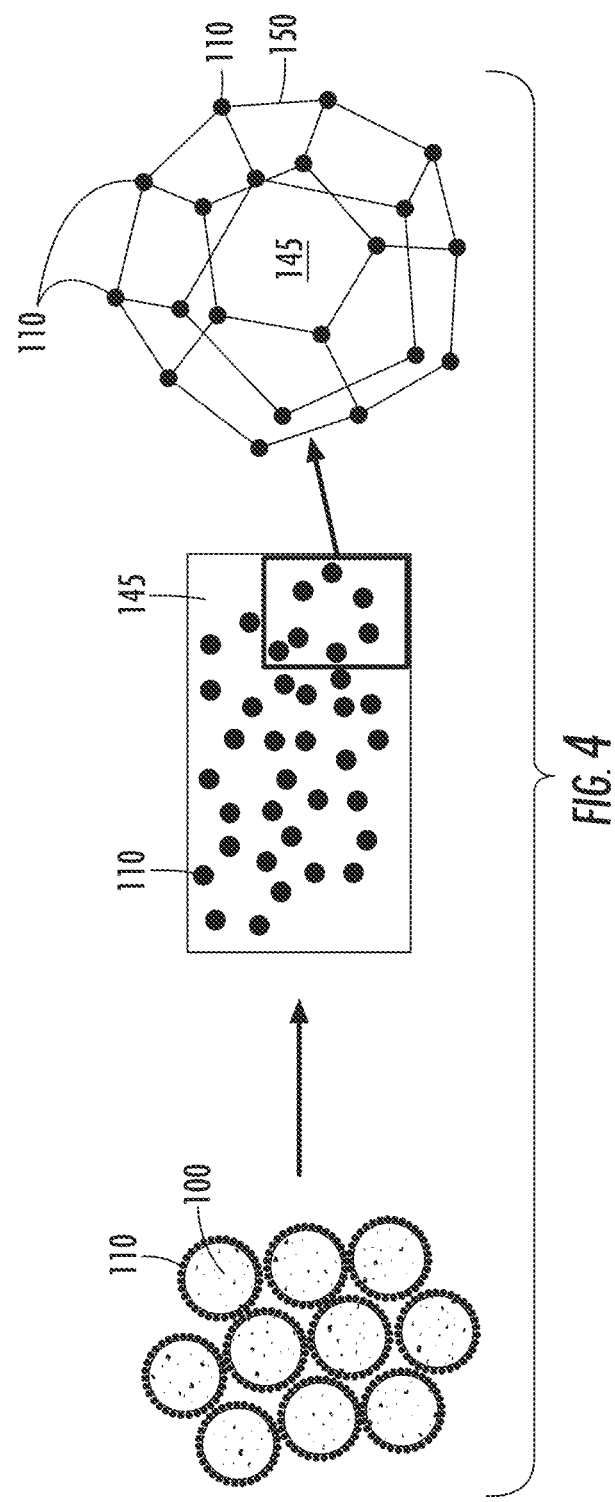
FIG. 4 illustrates exemplary semi-passive solidification control in which a melt solidifies with limited movement of assembled grain refiners, thereby allowing the grain refiners to orient in a three-dimensional structure which repeats throughout the final solid material in accordance with some example embodiments described herein.

FIG. 4 is a schematic illustration of semi-passive solidification control. In the embodiment illustrated in FIG. 4, base maraging steel alloy 100 has grain refiners 110 disposed on the surface 140 of the base maraging steel alloy 100. As shown in FIG. 4, a melt 145 solidifies with limited movement of assembled grain refiners 110, thereby allowing the grain refiners 110 to orient in a three-dimensional structure (plurality of grain refiners 110 in solidified material) which repeats throughout the final solid material 150.

Architected microstructures may be designed in which feature sizes (e.g., distance between grain refiner nodes) within the three-dimensional network are selected, along with targeted compositions, for an intended purpose. Similarly, layered composite structures may be designed in which feature sizes (e.g., layer thicknesses or distance between layers) are selected, along with targeted compositions, for an intended purpose.

Note that rejection to the surface is not necessarily required to generate layered structures. Functionalized surfaces may be relatively immobile from their initial position on the surface 140 of the base maraging steel alloy 100. During melting, these functionalized surfaces may act as nucleation sites, as previously mentioned; however, instead of absorption into the melt, they may initiate nucleation at the location which was previously occupied by the powder surface and is not molten. The result is a fine-grained structure evolving from the surface nucleation source, towards the center. This may result in a designed composite structure with enhanced properties over the base maraging steel alloy 100. In general, this mechanism allows for the ability to control the location of desired inclusions through controlled solidification.

In the additive manufacturing of maraging steel alloys, the problem of microstructural texturing of subsequent layers of molten metals induces anisotropic microstructures and thus anisotropic structural properties. Dispersing stable grain refiners 110, 115 in the solidifying layers may produce equiaxed grains 135 having isotropic features which are stable upon repetitive heating cycles.

Any solidification control method which derives its primary functionality from the surface functionalization of a powdered material can be considered in the scope of this invention. Other methods of control may include multiple types of control described above. An example of a combination of methods includes utilizing rejection to the surface, internal reaction, along with emissivity control. For instance, a part may be processed using additive manufacturing in which a functionalization material is selected to be dissolved into the surface and reacts to form an insoluble material which is rejected to the surface of the melt pool. This rejected material may then have a low emissivity, which reflects any additional laser radiation, thereby decreasing the local heating and cooling the material quickly to control solidification. The resulting structure is a material with a controlled solidification structure with a low-emissivity surface coating.

In some embodiments, the solid state is a three-dimensional microstructure containing the grain refiners 110, 115 as inclusions distributed throughout the solid state.

In some embodiments, the solid state is a layered microstructure containing one or more layers comprising the grain refiners 110, 115.

The method may further include creating a structure through one or more techniques selected from the group consisting of additive manufacturing, injection molding, pressing and sintering, capacitive discharge sintering, and spark plasma sintering. The present invention may provide a solid object or article comprising a structure produced using such a method.

FIG. 8 is a schematic illustration of surface melting of a functionalized maraging steel alloy 120, in which heat is applied and the grain refiners 110 react with the surface 140 to form a melt in a coating 180 covering less than 100% of the surface 140 of the base maraging steel alloy 100.

In some embodiments, the surface functionalization is in the form of a continuous or intermittent coating 180. A continuous coating 180 may cover at least 90% of the surface 140, such as about 95%, about 99%, or about 100% of the surface 140 (recognizing there may be defects, voids, or impurities at the surface). An intermittent coating 180 is non-continuous and may cover less than about 90%, such as about 80%, about 70%, about 60%, about 50%, about 40%, about 30%, about 20%, about 10%, about 5%, about 2%, about 1%, or less of the surface 140. An intermittent coating 180 may be uniform (e.g., having a certain repeating pattern on the surface 140) or non-uniform (e.g., random).

In general, the coating 180 may be continuous or discontinuous. The coating 180 may have several characteristic features. In one embodiment, the coating 180 may be smooth and conformal to the underlying surface 140. In another embodiment, the coating 180 may be nodular. The nodular growth is characteristic of kinetic limitations of nucleation and growth. For example, the coating 180 may look like cauliflower or a small fractal growing from the surface 140. These features can be affected by the underling materials, the method of coating, reaction conditions, etc.

A coating 180 may or may not be in the form of nanoparticles or microparticles. That is, the coating 180 may be derived from nanoparticles or microparticles, while discrete nanoparticles or microparticles may no longer be present. Various coating techniques may be employed, such as (but not limited to) electroless deposition, immersion deposition, or solution coating. The coating 180 thickness is preferably less than about 20% of the underlying particle diameter, such as less than about 15%, 10%, 5%, 2%, or about 1% of the underlying particle diameter.

Some variations provide a structure created from the functionalized maraging steel alloy 120 via additive manufacturing. The functionalized maraging steel alloy 120 (with grain refiners 110, 115) may be incorporated into the final structure. In some embodiments, the grain refiners 110, 115 are rejected, creating a scale. The scale may be unbonded to the structure. In some embodiments, the scale bonds to the structure or otherwise cannot be readily removed. This may be advantageous, such as to provide a structural enhancement—for instance, rejected ceramic particles may add a hard facing to the final structure. Rejected grain refiners 110, 115 may form a multilayer composite, wherein each layer has a different composition. In some embodiments, rejected grain refiners 110, 115 forms a spatially variant composition within the bulk of the structure. A three-dimensional architecture may also develop in the final microstructure.

FIG. 9 is a schematic illustration of the formation of a layered composite structure, in which a functionalized maraging steel alloy 120 having two different types of grain refiners 110, 115 leads to different particle segregation, resulting in a layered structure having a first grain refiner layer 181, a base maraging steel alloy layer 182, and a second grain refiner layer 183. In the schematic of FIG. 9, first grain refiner layer 181 results from grain refiners 110 (or reactions thereof), base maraging steel alloy layer 182 results from base maraging steel alloy 100 (or reactions thereof), and second grain refiner layer 183 results from grain refiners 115 (or reactions thereof).

Some variations provide a final solid material 150 or article comprising at least one solid phase (i) containing a powdered base maraging steel alloy 100 as described, or (ii) derived from a liquid form of a base maraging steel alloy 100 as described. The solid phase may form from about 0.25 wt % to about 100 wt % of the final solid material 150 or article, such as about 1 wt %, 5 wt %, 10 wt %, 25 wt %, 50 wt %, or about 75 wt % of the final solid material 150 or article, for example.

Other variations of the invention provide a final solid material 150 or article comprising a continuous solid phase and a three-dimensional network of grain refiner 110, 115 inclusions distributed throughout the continuous solid phase, wherein the three-dimensional network blocks, impedes, or redirects dislocation motion within the final solid material 150 or article.

The grain refiners 110, 115 may have an average maximum particle dimension from about 1 nanometer to about about 100 microns. In some embodiments, the average maximum particle dimension may be less than about 100 nanometers. In these or other embodiments, the grain refiners 110, 115 may have an average minimum particle dimension from about 1 nanometer to about 1 micron, such as less than about 100 nanometers. By "average maximum particle dimension" it is meant the number average of the maximum particle dimensions across all the grain refiners 110, 115 present. By "average minimum particle dimension" it is meant the number average of the minimum particle dimensions across all the grain refiners 110, 115 present. A perfect sphere has a single dimension, the diameter, which is both the minimum and maximum particle dimension. A cylinder has two characteristic length scales: the length (height) and the diameter. When the cylinder is in the form of a long rod, the maximum particle dimension is the length and the minimum particle dimension is the diameter. In various embodiments, the grain refiners may have an average maximum particle dimension of about, or less than about, 10, 25, 50, 75, 100, 150, 200, 250, 300, 400, 500, 600, 700, 800, 900, or about 1000 nanometers. In various embodiments, the grain refiners 110, 115 may have an average minimum particle dimension of about, or less than about, 5, 10, 25, 50, 75, 100, 150, 200, 250, 300, 400, or about 500 nanometers.

In some embodiments, light elements are incorporated into the system. For example, the base maraging steel alloy 100 may be surface-reacted with an element selected from the group consisting of hydrogen, oxygen, carbon, nitrogen, boron, sulfur, and combinations thereof. For example, reaction with hydrogen gas may be carried out to form a metal hydride. Optionally, the base maraging steel alloy 100 or grain refiners 110, 115 may further contain a salt, carbon, an organic additive, an inorganic additive, or a combination thereof. Certain embodiments utilize relatively inert carbides that are incorporated (such as into steel) with fast melting and solidification.

Methods of producing surface-functionalized maraging steel alloys 120 are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein in their entireties. These disclosures relate to methods of coating certain materials onto micropowders, in some embodiments.

For example, as described in U.S. patent application Ser. No. 14/860,332, grain refiners 110, 115 may be applied using immersion deposition in an ionic liquid, depositing a more-noble metal on a substrate of a less noble, more electronegative metal by chemical replacement from a solution of a metallic salt of the coating metal. This method requires no external electric field or additional reducing agent, as with standard electroplating or electroless deposition, respectively. The metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof.

Organic ligands may be reacted onto a metal, in some embodiments. Organic ligands may be selected from the group consisting of aldehydes, alkanes, alkenes, silicones, polyols, poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), poly(carboxymethylcellulose), poly(D- or L-lysine), poly(L-glutamic acid), poly(L-aspartic acid), poly(glutamic acid), heparin, dextran sulfate, 1-carrageenan, pentosan polysulfate, mannan sulfate, chondroitin sulfate, and combinations or derivatives thereof.

The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium.

The final solid material 150 may have porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

In some embodiments of the invention, the particles of the functionalized maraging steel alloy 120 may be fused together to form a continuous or semi-continuous material. As intended in this specification, "fused" should be interpreted broadly to mean any manner in which particles are bonded, joined, coalesced, or otherwise combined, at least in part, together. Many known techniques may be employed for fusing together particles.

In various embodiments, fusing is accomplished by sintering, heat treatment, pressure treatment, combined heat/pressure treatment, electrical treatment, electromagnetic treatment, melting/solidifying, contact (cold) welding, solution combustion synthesis, self-propagating high-temperature synthesis, solid state metathesis, or a combination thereof.

When a heat treatment is utilized, the heat or energy may be provided by electrical current, electromagnetic energy, chemical reactions (including formation of ionic or covalent bonds), electrochemical reactions, pressure, or combinations thereof. Heat may be provided for initiating chemical reactions (e.g., to overcome activation energy), for enhancing reaction kinetics, for shifting reaction equilibrium states, or for adjusting reaction network distribution states.

Some possible powder metallurgy processing techniques that may be used include, but are not limited to, hot pressing, sintering, high-pressure low-temperature sintering, extrusion, metal injection molding, and additive manufacturing.

A final solid material 150 may be produced by a process selected from the group consisting of hot pressing, cold pressing and sintering, extrusion, injection molding, additive manufacturing, electron beam melting, selected laser sintering, pressureless sintering, and combinations thereof. The solid article may be, for example, a coating, a coating precursor, a substrate, a billet, a net shape part, a near net shape part, or another object.

The present disclosure is applicable to additive manufacturing and welding applications, along many other applications. Some embodiments provide powder metallurgy processed parts that are equivalent to machined parts. Some embodiments provide surface coatings that resist corrosion, which coatings are formed during the part fabrication instead of as an extra step.

Other commercial applications include, but are not limited to, complex component integration (reduce number of individual parts used to make one assembly), reduced-weight optimized structures, battery and fuel cell electrodes, catalyst materials, lightweight fillers, complex tooling, and improved performance of existing parts.

In some embodiments, the concentration of grain refiner may depend on the selected base maraging steel alloy 100 and the grain refiner 110, 115. In some embodiments, the amount of grain refiner 110, 115 may be greater than about 0.01 vol % of the functionalized maraging steel alloy 120 and in some embodiments, the amount of grain refiner 110, 115 may be greater than about 0.05 vol % of the functionalized maraging steel alloy 120. In some embodiments, the amount of grain refiner 110, 115 may be greater than about 0.5 vol % or greater than about 1 vol % of the functionalized maraging steel alloy 120.

ASTM E112, Standard Test Methods for Determining Average Grain Size may be used to determine grain size and illustrate grain refinement potential of the present disclosure. For example, in some cases the grain refiner may be needed in greater than about 0.5 vol % or greater than about 1 vol % of the functionalized maraging steel alloy. In certain alloys minimizing the grain refinement may be ideal to avoid potential detrimental interactions.

The present maraging steel alloy may be used for a variety of applications, such as improved tooling for injection molding for forging, through-hardened gear material, high strength maraging steel components with optimized geometries, and other such applications. Further, the present disclosure may be applicable across a variety of maraging steel alloy systems, such as those specifically discussed herein and others.

FIG. 14 illustrates an exemplary embodiment of the present application utilizing the disclosed functionalized maraging steel alloy 120 in an aircraft 195. As shown in FIG. 14, the maraging steel alloy 120 may be incorporated into the structure of the aircraft 195, providing high strength to such structure. The functionalized maraging steel alloy 120 may be incorporated into a variety of components of the aircraft 195, not limited to the location depicted in FIG. 14, and may provide improved strength to such components.

The following examples are provided for illustrating one or more embodiments of the present invention and should not be construed as limiting the invention.

Examples

FIGS. 10a-10c illustrate various microstructures including equiaxed microstructures in accordance with embodiments of the present disclosure. In particular, FIGS. 10a and 10b are images from a scanning electron microscope (SEM). FIG. 10a illustrates columnar grains 185 of a typical M300 type alloy produced via additive manufacturing. As shown in FIG. 10a, the resulting microstructure has a high columnar grain structure. FIG. 10b illustrates a M350 type composition with 1 vol % $CeO_2$ as a grain refiner 110 resulting in equiaxed grains 135 producing an equiaxed microstructure 185. FIG. 10c illustrates a characteristic scallop pattern 186 seen in both FIGS. 10a and 10b which indicates that the material was prepared with additive manufacturing. As seen in FIGS. 10a-10c, the additive manufacturing process produces a unique microstructure with a weld like pattern.

Figure 11A:
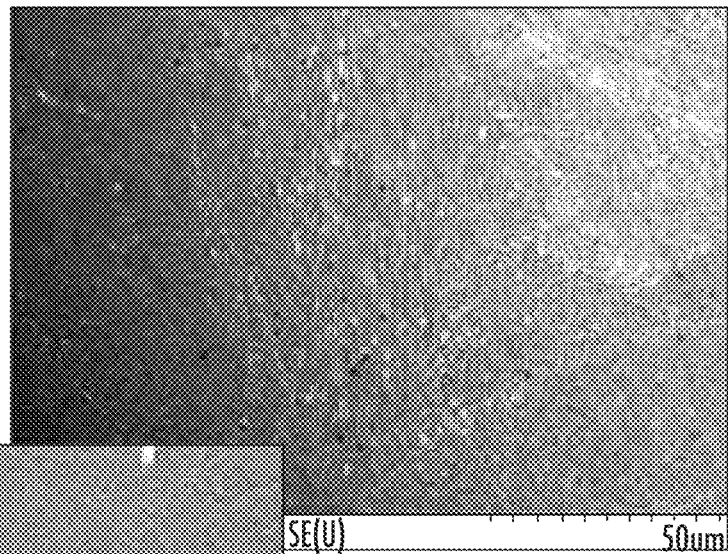
Figure 11B:
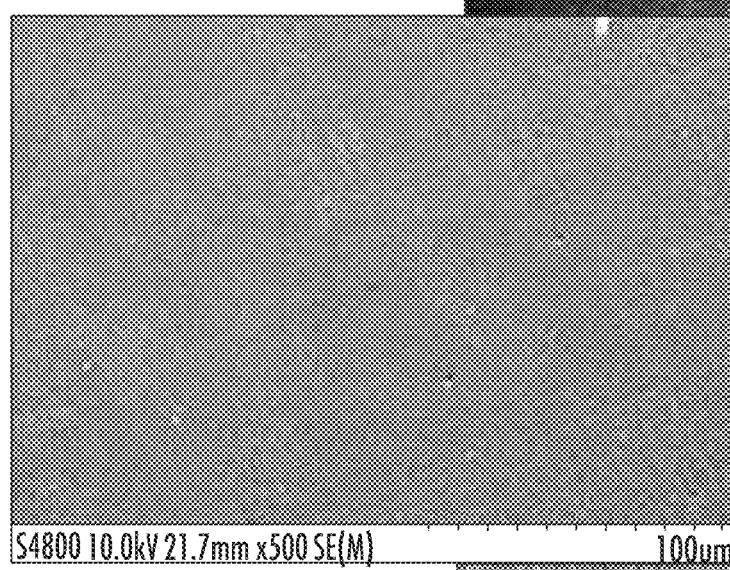
Figure 11C:
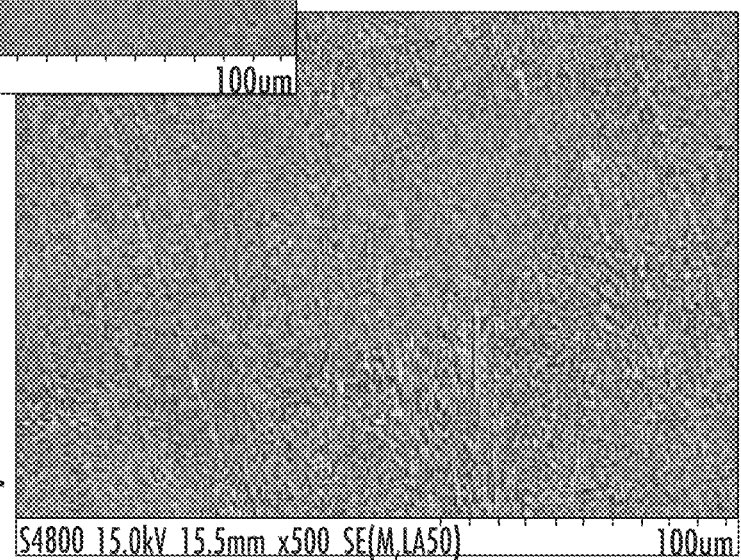

Examples of the grain refiner potential is shown in FIGS. 11a-11f. In particular, FIGS. 11a-11f are images from a scanning electron microscope (SEM). FIG. 11a illustrates CL50, which is an M300 compositional variant. FIG. 11b illustrates Fe377, which is an M350 compositional variant. FIG. 11c illustrates Fe378, which is an M350 compositional variant with minor additions of Nb and B dissolved in the alloy. FIG. 11d illustrates Fe377 with $CeO_2$ as grain refiners 110. FIG. 11e illustrates Fe377 with TiN as grain refiners 110. FIG. 11f illustrates Fe377 with $TiB_2$ as grain refiners. As shown in FIGS. 11a-11c, the maraging steel alloys formed without grain refiners have high columnar grain structures. In comparison, as shown for example in FIGS. 11d-11f, the functionalized maraging steel alloys 120 result in equiaxed microstructures.

Figure 12:
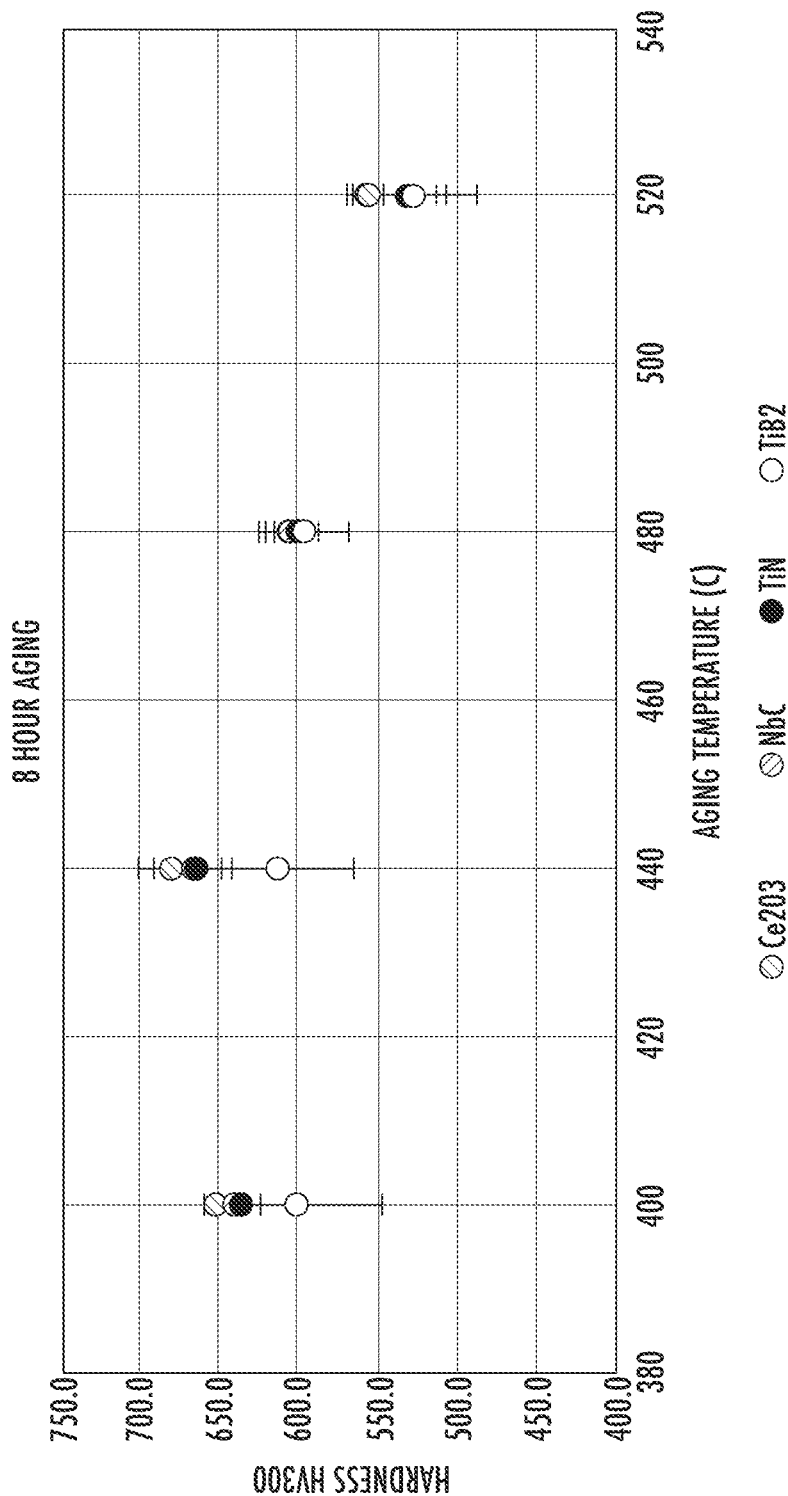
FIG. 12 is a graph of hardness versus aging temperature and illustrates exemplary data for the resulting heat treatment responses of the functionalized maraging steel alloys in accordance with some example embodiments disclosed herein.

Data for the resulting heat treatment responses of exemplary functionalized maraging steel alloys 120 are shown in FIG. 12. As shown in FIG. 12, for example, high hardness values may be achieved with the incorporation of the disclosed grain refiners 110, 115 in the functionalized maraging steel alloy 120 during additive manufacturing. The base maraging steel alloy 100 in FIG. 12 was an M350 compositional variant. The results illustrated in FIG. 12 indicate that high hardness may be possible with the disclosed functionalized maraging steel alloy 120 prepared using additive manufacturing.

In some embodiments, a heat treatment of 480° C. may be recommended; however, as shown in FIG. 12, the disclosed functionalized maraging steel alloys 120 may have peak strength when aged at lower aging temperatures. By aging, high strengths may be provided with the functionalized maraging steel alloy 120.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

Having described example embodiments at a high level, the design of the various configurations performing various example operations is provided below.

Further, the disclosure comprises embodiments according to the following clauses:

Clause A1. A maraging steel alloy comprising: a base maraging steel alloy, a grain refiner dispersed among the base maraging steel alloy, and optionally, a strengthening element, wherein the base maraging steel alloy is surface-functionalized with the grain refiner.

Clause A2. The maraging steel alloy according to Clause A1, wherein the base maraging steel alloy comprises aluminum, cobalt, molybdenum, nickel, titanium, or combinations thereof and has a tensile strength over 1300 MPa.

Clause A3. The maraging steel alloy according to Clause A1 or A2, wherein the grain refiner comprises titanium, zirconium, boron, aluminum, tantalum, tungsten, carbon, niobium, cerium, or combinations thereof as pure metals, oxides, hydrides, carbides, nitrides, intermetallics, borides, or combinations thereof.

Clause A4. The maraging steel alloy according to any one of Clause A1 to A3, wherein the strengthening element comprises nickel, aluminum, cobalt, chromium, molybdenum, carbon, manganese, niobium, zirconium, titanium, or combinations thereof.

Clause A5. The maraging steel alloy according to any one of Clause A1 to A4, wherein the grain refiner comprises $TiB_2$, $CeO_2$, TiN, NbC, or combinations thereof.

Clause A6. The maraging steel alloy according to any one of Clause A1 to A5, wherein the grain refiner comprises from about 0.01% by volume to about 10% by volume of the maraging steel alloy.

Clause A7. The maraging steel alloy according to any one of Clause A1 to A6, wherein the maraging steel alloy comprises an equiaxed microstructure.

Clause A8. The maraging steel alloy according to any one of Clause A1 to A7, wherein the equiaxed microstructure comprises a plurality of grains of less than 1 mm in diameter.

Clause A9. The maraging steel alloy according to any one of Clause A1 to A8, wherein the equiaxed microstructure comprises uniform grain patterns along the x and y direction.

Clause A10. The maraging steel alloy according to any one of Clause A1 to A9, wherein the equiaxed microstructure forms a scallop pattern.

Clause A11. An aircraft comprising the maraging steel alloy according to any one of Clause A1 to A10.

Clause B1. A method of manufacturing maraging steel comprising mixing a base maraging steel alloy with a grain refiner resulting in a maraging steel mixture, melting the maraging steel mixture, and solidifying the maraging steel mixture forming an equiaxed microstructure.

Clause B2. The method of manufacturing maraging steel according to Clause B1, wherein solidifying the maraging steel mixture comprises solidifying a first layer of the maraging steel mixture along a single axis, followed by solidifying an adjacent layer of the maraging steel mixture along the same axis.

Clause B3. The method of manufacturing maraging steel according to Clause B1 or B2, wherein the base maraging steel alloy is present as a powder when mixed with the grain refiner.

Clause B4. The method of manufacturing maraging steel according to any one of Clause B1 to B3, wherein the base maraging steel alloy and the grain refiner have a lattice strain less than 5%.

Clause B5. The method of manufacturing maraging steel according to any one of Clause B1 to B4, wherein the base maraging steel alloy and the grain refiner have an atomic density difference of less than 25%.

Clause B6. The method of manufacturing maraging steel according to any one of Clause B1 to B5, wherein the base maraging steel alloy comprises aluminum, cobalt, molybdenum, nickel, titanium, or combinations thereof and a tensile strength over 1300 MPa.

Clause B7. The method of manufacturing maraging steel according to any one of Clause B1 to B6, wherein the grain refiner comprises titanium, zirconium, boron, aluminum, tantalum, tungsten, carbon, niobium, cerium, or combinations thereof as pure metals, oxides, hydrides, carbides, nitrides, intermetallics, borides, or combinations thereof.

Clause B8. The method of manufacturing maraging steel according to any one of Clause B1 to B7, wherein the base maraging steel alloy further comprises a strengthening element comprising nickel, aluminum, cobalt, chromium, molybdenum, carbon, manganese, niobium, zirconium, titanium, or combinations thereof.

Clause B9. The method of manufacturing maraging steel according to any one of Clause B1 to B8, wherein the grain refiner comprises $TiB_2$, $CeO_2$, TiN, NbC, or combinations thereof.

Clause B10. The method of manufacturing maraging steel according to any one of Clause B1 to B9, wherein the grain refiner comprises from about 0.01% by volume to about 10% by volume of the maraging steel alloy.

The word "exemplary", when used herein, is intended to mean "serving as an example, instance, or illustration". Any implementation described herein as "exemplary" is not necessarily preferred or advantageous over other implementations.

As used in the specification and in the appended claims, the singular forms "a", "an", and "the" include plural referents unless the context clearly indicates otherwise. For example, reference to "a stiffener-member" includes a plurality of such stiffener-members, unless the context clearly indicates otherwise.

As used in the specification and in the appended claims, reference to "on" includes both embodiments in which a component is disposed directly on another component as well as embodiments in which one or more intervening layers or elements are disposed between the components.

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A maraging steel alloy comprising:
   a powdered base maraging steel alloy,
   one or more grain refiners dispersed among the powdered base maraging steel alloy,
   and optionally, a strengthening element,
   wherein the powdered base maraging steel alloy is surface-functionalized with the one or more grain refiners such that the one or more grain refiners comprise microparticles coating the powdered base maraging steel alloy;
   wherein a sum total of the one or more grain refiners comprises from about 0.01% by volume to about 8% by volume of the maraging steel alloy; and
   wherein the one or more grain refiners comprise:
   (i) tantalum, tungsten, or niobium as pure metals, oxides, hydrides, carbides, nitrides, intermetallics, borides, or combinations thereof;
   or,
   (ii) TiN.

2. The maraging steel alloy according to claim 1, wherein the powdered base maraging steel alloy comprises aluminum, cobalt, molybdenum, nickel, titanium, or combinations thereof and has a tensile strength over 1300 MPa.

3. The maraging steel alloy according to claim 1, wherein the strengthening element comprises nickel, aluminum, cobalt, chromium, molybdenum, carbon, manganese, niobium, zirconium, titanium, or combinations thereof.

4. The maraging steel alloy according to claim 1, wherein the maraging steel alloy comprises an equiaxed microstructure.

5. The maraging steel alloy according to claim 4, wherein the equiaxed microstructure comprises a plurality of grains of less than 1 mm in diameter.

6. The maraging steel alloy according to claim 4, wherein the equiaxed microstructure comprises uniform grain patterns along an x and y direction.

7. The maraging steel alloy according to claim 4, wherein the equiaxed microstructure forms a scallop pattern.

8. The maraging steel alloy according to claim 1, wherein the sum total of the one or more grain refiners comprise from about 0.1% by volume to about 5% by volume of the maraging steel alloy.

9. The maraging steel alloy according to claim 1, wherein the sum total of the one or more grain refiners comprise from about 0.1% by volume to about 1% by volume of the maraging steel alloy.

10. The maraging steel alloy according to claim 1, wherein the one or more grain refiners comprise nanoparticles.

11. The maraging steel alloy according to claim 1, wherein the powdered base maraging steel alloy comprises micropowders.

12. The maraging steel alloy according to claim 1, wherein the powdered base maraging steel alloy comprises macropowders.

13. The maraging steel alloy according to claim 1, wherein at least 1% of the powdered base maraging steel alloy is surface-functionalized with the one or more grain refiners.

14. The maraging steel alloy according to claim 13, wherein at least 50% of the powdered base maraging steel alloy is surface-functionalized with the one or more grain refiners.

15. The maraging steel alloy according to claim 1, wherein the powdered base maraging steel alloy and the one or more grain refiners have a lattice strain less than 5%.

16. The maraging steel alloy according to claim 1, wherein the powdered base maraging steel alloy and the one or more grain refiners have an atomic density difference of less than 25%.

* * * * *